(12) United States Patent
Mansour et al.

(10) Patent No.: US 11,474,813 B2
(45) Date of Patent: Oct. 18, 2022

(54) SYSTEM FOR MANAGING SUBSCRIBER AND PROJECT UPDATES USING A NETWORKED PROJECT COMMUNICATION SYSTEM

(71) Applicants: Atlassian Pty Ltd., Sydney (AU); Atlassian Inc., San Francisco, CA (US)

(72) Inventors: Sherif George Mansour, Sydney (AU); Sam Alexander Tardif, Sydney (AU); Bradley John Rodgers, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 17/038,969

(22) Filed: Sep. 30, 2020

(65) Prior Publication Data

US 2022/0100497 A1   Mar. 31, 2022

(51) Int. Cl.
*G06F 8/71* (2018.01)
*G06F 8/65* (2018.01)
*G06F 8/73* (2018.01)

(52) U.S. Cl.
CPC .............. *G06F 8/71* (2013.01); *G06F 8/65* (2013.01); *G06F 8/73* (2013.01)

(58) Field of Classification Search
CPC .. G06F 8/71; G06F 8/65; G06Q 10/06; G06Q 10/103
See application file for complete search history.

(56) References Cited

U.S. PATENT DOCUMENTS

| 5,950,206 | A  | * | 9/1999  | Krause    | G06Q 10/06 |
| 6,282,514 | B1 | * | 8/2001  | Kumashiro | G06Q 10/06 |
|           |    |   |         |           | 705/7.11   |
| 7,620,948 | B1 | * | 11/2009 | Rowe      | G06F 8/65  |
|           |    |   |         |           | 717/171    |
| 9,690,820 | B1 | * | 6/2017  | Girulat, Jr. | G06Q 40/06 |
| 2007/0079231 | A1 | * | 4/2007 | Ahyh     | G06F 8/71  |
|           |    |   |         |           | 715/204    |
| 2011/0137940 | A1 | * | 6/2011 | Gradin   | G06F 16/9535 |
|           |    |   |         |           | 707/769    |

(Continued)

OTHER PUBLICATIONS

Liang et al, "Project management of web-based product development teleservice", [Online], 2006, pp. 162-168, [Retrieved from internet on May 5, 2022], <https://link.springer.com/content/pdf/10.1007/s00170-005-0308-2.pdf> (Year: 2006).*

*Primary Examiner* — S. Sough
*Assistant Examiner* — Zengpu Wei
(74) *Attorney, Agent, or Firm* — Brownstein Hyatt Farber Schreck, LLP

(57) ABSTRACT

Described herein is a computer implemented method. The method comprises storing project data in relation to a plurality of projects in a data store. In response to determining that a project update process has been triggered for a particular project, a project owner is identified and a project update request is generated and communicated to the project owner. Project updates are received, and in response to determining that a subscriber update process has been triggered for a particular subscriber, one or more projects are identified and updates in respect of those projects are generated and communicated to the particular subscriber.

20 Claims, 16 Drawing Sheets

(56) References Cited

U.S. PATENT DOCUMENTS

| | | | | |
|---|---|---|---|---|
| 2012/0102114 A1* | 4/2012 | Dunn | ............... | G06Q 50/01 |
| | | | | 709/204 |
| 2013/0041899 A1* | 2/2013 | Simske | ............ | H04L 67/22 |
| | | | | 707/736 |
| 2013/0046549 A1* | 2/2013 | Colby | ............ | G06Q 10/06 |
| | | | | 705/1.1 |
| 2013/0290053 A1* | 10/2013 | Zumwalt | ............ | G06Q 10/06 |
| | | | | 705/7.15 |
| 2014/0350985 A1* | 11/2014 | Pink | ............ | G06Q 10/063118 |
| | | | | 705/7.17 |
| 2015/0073929 A1* | 3/2015 | Psota | ............ | G06Q 30/0241 |
| | | | | 705/26.2 |

\* cited by examiner

Figure 16

SYSTEM FOR MANAGING SUBSCRIBER AND PROJECT UPDATES USING A NETWORKED PROJECT COMMUNICATION SYSTEM

TECHNICAL FIELD

The present disclosure is generally directed to a project communication platform and, more specifically, to a system for managing project updates and subscriber updates using a networked project communication system.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Traditional project management systems may track a large number of projects and the status of a large number of users. While some traditional systems can be used to store and track large volumes of project data, obtaining useful information may be difficult or impractical given the larger number of users and data that is being tracked. The systems and techniques described herein may be used to manage subscriber updates and project updates using a networked communication system or tool.

BRIEF DESCRIPTION OF THE DRAWINGS

In the drawings:

FIG. 16 is an example subscribed projects user interface.

Figure 1:
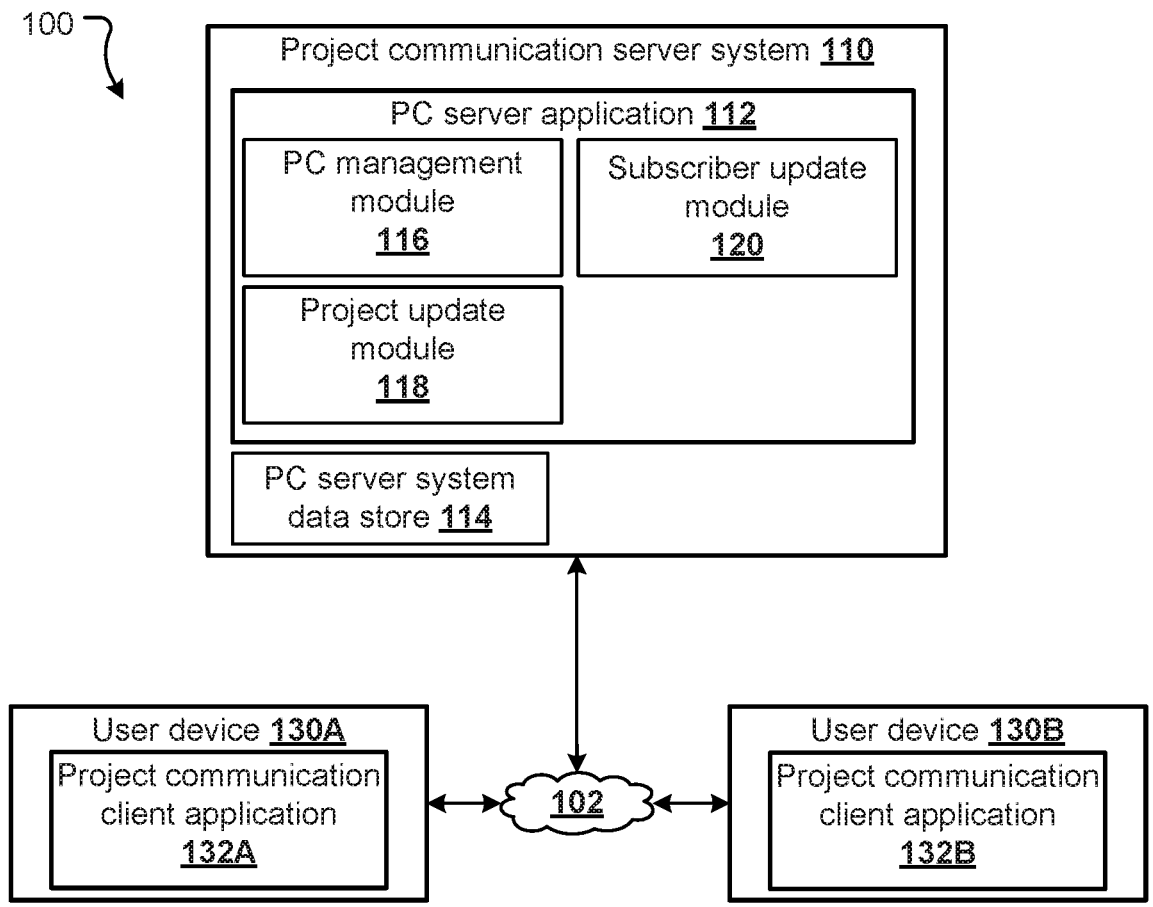
FIG. 1 is a block diagram of a networked environment according to aspects of the present disclosure.

While the disclosed embodiments are amenable to various modifications and alternative forms, specific embodiments are shown by way of example in the drawings and are described in detail. It should be understood, however, that the drawings and detailed description are not intended to limit the embodiments to the particular form disclosed. The intention is to cover all modifications, equivalents, and alternatives falling within the spirit and scope of the present disclosure as defined by the appended claims.

DETAILED DESCRIPTION

In the following description, for the purposes of explanation, numerous specific details are set forth in order to provide a thorough understanding of the present disclosure. It will be apparent, however, that features of the present disclosure may be practiced without these specific details. In some instances, well-known structures and devices are shown in block diagram form in order to avoid unnecessary obscuring.

The present disclosure relates to a project communication tool or system for providing status updates of projects. Specifically, the project communication tool or system allows users to conveniently create and subscribe to (e.g. follow) projects. The tool or system is also configured to automatically prompt project owners for project updates and deliver digests of project updates to subscribers.

Generally speaking, a project is a set of collected project data relating to a project as defined by project fields. By way of example, project fields may include fields such as the following.

A unique project identifier field for storing an identifier used to uniquely identify a project. The unique project identifier is typically automatically generated when creating a project and may, or may not, be visible to users.

A project owner field for storing a user identifier of an individual (or a team) who is assigned the role of project owner. The project owner may be the same as the creator of a projects or a different user, and may change over time.

A project name field for storing a name for the project.

A project goal field for storing a description of the goal of the project (e.g. a desired outcome of the project).

A project purpose field for storing a description of the purpose of the project (e.g. why the project is necessary).

A project worker field for storing identifiers (e.g. user identifiers) of one or more individuals and/or teams working on the project.

A project success definition field for storing a description of what will make the project successful (e.g. how success will be measured).

A project subscribers field for storing identifiers (e.g. user identifiers) of individuals and/or teams who have subscribed (i.e. are following/watching) a project. A project subscriber could be any interested stakeholder, for example, an internal stakeholder (i.e. within the organization) or an external stakeholder (i.e. outside the organization).

A project status field for storing a value indicating a current status of the project. For example, a project status may be selected from a set of system or user defined status values. Example status values may include, but are not limited to, statuses such as "on track", "at risk", "ahead of schedule", "behind schedule", "completed on schedule", "completed behind schedule", or the like. It will be appreciated that other status values may be used. It is also envisaged that a project creator and/or owner may be able to add custom status values.

A project updates field for storing periodic project updates (e.g. descriptions) submitted by the project owner.

A related projects field for storing identifiers of other projects that are in some way related to the present project. For example, a given project may be dependent on one or more other projects and/or may be depended upon by one or more other projects.

A project groups field for storing an identifier of a project group to which the present project belongs. Projects may, for example, be grouped into collections, initiatives, and/or other collections of similar projects.

A common goal(s) field for storing identifier(s) of one or more common goals of the organization that the project has been assigned to. The present project, along with other projects, may contribute to achieving a common within the organization.

It will be appreciated that the above list is not exhaustive and that a project may include additional and/or alternative project fields. Further, while some project fields may be made mandatory/required not all will be.

The project communication tool or system may be configured to provide a default set of fields (optional and required) for projects being created—for example a set of fields such as the above (though alternatives are possible). In addition, the project communication tool may be configured to provide a mechanism for users (or, at east, appropriately permissioned users) to change the default fields and/or add custom project fields. Generally speaking, any fields that are deemed to be useful for communicating information about a project may be created and defined as optional or required fields. For example, such fields could include a cost center field defining a cost center relevant to the project being created, a project sponsor(s) field for defining one or more project sponsor(s), a project data source(s) field for defining additional sources of data that relate to the project (for example, a reference to a project or the like maintained in issue tracking system, a code base maintained for the project in a source code management system, and or other sources of data that relate to the project).

Project data—i.e. data defining project fields such as those above—may be stored in any appropriate data structure (or set of related data structures). By way of example, the project data may be stored in a set of related database tables as set out below.

In this example, a project details table stores project details records defining various data in respect of a project. For example, each project details record may store the following data:

| Project ID | Project owner user ID | Project name | Project Goal | Project Purpose | Success definition | Project status |
|---|---|---|---|---|---|---|

A project subscriber table associating subscribers (i.e. individuals and/or teams) with projects. In this example, each subscriber table record defines a subscriber identifier (e.g. a user identifier) and a project identifier. For example:

| Project ID | Subscriber ID |
|---|---|

A project worker table associating workers (i.e. individuals and/or teams) with projects. In this example, each worker table record includes a project identifier and a user identifier of a user (worker) working on the identified project. For example:

| Project ID | Worker user ID |
|---|---|

A project update table storing project updates submitted by the project owners. The project update table defines project update records, each of which includes: a project identifier; an update timestamp recording the time and/or date the project update was submitted; an update description providing details of the project update; a project status defining the project status of the project at the time of the update; and a comments field for any comments submitted by subscribers relating to the project update. Below is an example of a project update table.

| Project ID | Project update timestamp | Update description | Project status | Subscriber comments |
|---|---|---|---|---|

A related projects table storing project dependencies. In this example, the related project table defines project dependency record for each project that is dependent on another project. Each project dependency record defines two project identifiers: a project identifier of a dependent project and a project identifier of a dependent upon project (the 'dependent' project depending upon the 'dependent upon' project). Below is an example of a related projects table.

| Dependent project ID | Depended upon project ID |
|---|---|

A project groups table associating projects with project groups. In this example, the project groups table defines project group records for project groups. Each project group record defines a project group identifier (identifying a project group) and a project identifier (identifying a project that has been associated with that group)—e.g.:

| Project group ID | Project ID |
|---|---|

An associated goal table associating projects with common goals. In this example, the associated goal table defines associated goal records, each of which defines a common goal identifier (identifying a common goal) and a project identifier (identifying a project that has been associated with that common goal). Each common goal identifier may be used to identify details of a common goal in one or more goal details tables. Below is an example of an associated goals table.

| Common goal ID | Project ID |
|---|---|

The creation of additional project data fields will cause associated tables to be created in order to store data for those fields. For example, and very generally speaking, each additional field that is created by a user may cause creation of one or more a new table that defines records that include a project identifier and the data that is sought to be captured.

Additional and/or alternative data structures (with additional and/or alternative fields) may be used to store project data. Furthermore, while in the example above a relational database model has been used alternative database models could be used (e.g. a key-value pair data store or alternative database model).

In the following, an overview of an example environment illustrating different systems involved in certain embodiments will be described, followed by a description of a computer system which can be configured in various ways to perform the embodiments/various features thereof as described herein. Following this, an example project communication software tool will be described.

FIG. 1 illustrates an example environment 100 in which embodiments and features of the present disclosure are implemented. Example environment 100 includes a communications network 102 which interconnects a project communication server system 110, a user device 130A and a user device 130B. For ease of reference, the acronym PC will at times be used herein in place of "project communication".

The PC server system 110 includes a server application 112 (server application 112 for short) and a PC server system data store 114 (data store 114 for short). The data store 114 is used for storing data related to functions performed by the PC server system 110, for example, project data of one or more projects managed by the PC server system 110.

The server application 112 configures the PC server system 110 to provide server side functionality for client applications (e.g. client applications 132A and 132B). Generally speaking, this involves receiving and responding to requests from client applications (e.g. client applications 132A and 132B discussed below). The server application 112 may be a web server (for interacting with web browser clients) or an application server (for interacting with dedicated application clients). While PC server system 110 has been illustrated with a single server application 112, it may provide multiple server applications (e.g. one or more web servers and/or one or more application servers).

In this example, the server application 112 includes a PC management module 116, a project update module 118, and a subscriber update module 120. Generally speaking, the PC management module 116 is configured to collect project data when a project is created and store the collected project data on the data store 114. The PC management module 116 is also configured to collect subscriber data (e.g. user identifiers who have subscribed to a project) and store the subscriber data on the data store 114. As an example, the PC management module 116 may be configured to write the project data to a project details record in a project details table stored on the data store 114 and write the subscriber data to a respective subscriber record of a subscriber table stored on the data store 114.

The project update module 118 is configured to periodically prompt a project owner (e.g. through the client application 132A on user device 130A) to provide a project update relating to their project. The project update module 118 is also configured to receive project updates from a project owner (e.g. using the client application 132A on user device 130A) and store the project updates on the data store 114. As an example, the project update module 118 may be configure to write each received project update to a project update record in a project updates table stored on the data store 114.

For a given subscriber (i.e. user), the digest management module 120 is configured to periodically retrieve project updates (e.g. from the data store 114) relating to the projects the subscriber has subscribed to and generate a project update digest based on the retrieved project updates. After the digest management module 120 has generated the project update digest, the digest management module 120 is configure to communicate the project update digest to the subscriber. The digest management module 120 may communicate the project update digest to the subscriber through client application 132B on user device 130B, by email to the subscriber's nominated email address(es), and/or other communication means. As an example, the subscriber's user identifier stored in a subscriber table may be used to identify the subscriber's details in a user table to determine the subscriber's nominated email address(es).

In the present example, the project communication management module 116, the project update module 118, and the subscriber update module 120 have been described as modules of the server application 112—for example add-ons, plug-ins, or other software components that integrate with and expand the functionality of the server application 112. The functionality provided by one or more of these modules could, however, be performed by separate/stand-alone applications. As a further alternative, the functionality provided by one or more of these modules could be native functionality of the server application 112.

In certain embodiments, the PC server system 110 is a scalable system. Depending on demand from clients (and/or other performance requirements), compute nodes can be provisioned/de-provisioned on demand. As an example, if there is high client demand additional server applications 112 may be provisioned to cater for that demand. In this case, each functional component of the PC server system 110 may involve one or several applications running on the same or separate computer systems, each application including one or more application programs, libraries, APIs or other software that implements the functionality described herein.

The user device 130A includes a client application 132A, which, when executed by the user device 130A (e.g. by a processing unit such as 202 described below), configures the user device 130A to provide project communication functionality to allow users to create projects, update project, subscribe to projects, and/or receive project update digests. This involves communicating with the PC server system 110 (and, in particular, the server application 112).

The user device 130B has a client application 132B and may operate in an identical or similar manner to user device 130A. Accordingly, user device 130A and user device 130B may be identical and operate identically. However, it is envisaged that user device 130A and user device 130B may be different and operate differently. For example, the client application (e.g. client application 130A) for workers may be different to the client application (e.g. client application 130B) for subscribers. Subscribers may not even need a client application if project update digests are, for example, delivered by email or other communication means. In the description below, user device 130A will be described from the point of view of a project creator/owner and user device 130B will be described from the point of view of a project subscriber (recognizing that a user who is a project creator/owner for one project may also be a subscriber for that and/or other projects).

In the present example, while a single user device 130A and a single user device 130B has been depicted, environment 100 will typically include multiple user devices 130A and multiple user devices 130B, each configured to interact with the PC server system 110. User device 130A and user device 130B may be any form of computing device. Typically, user device 130A and user device 130B will be personal computing devices—e.g. a desktop computer, laptop computer, tablet computer, smart phone, or other computing device.

Communications between the various systems in environment 100 are via the communications network 102.

Communications network 102 may be a local area network, public network (e.g. the Internet), or a combination of both.

While environment 100 has been provided as an example, alternative system environments/architectures are possible.

The features and techniques described herein are implemented using one or more computer processing systems. For example, in networked environment 100 described above, user device 130A and user device 130B may be computer processing systems (for example, a personal computer, tablet/phone device, or other computer processing system). Similarly, the various functions performed by the PC server system 110 are performed by one or more computer processing systems (e.g. server computers or other computer processing systems).

Figure 2:
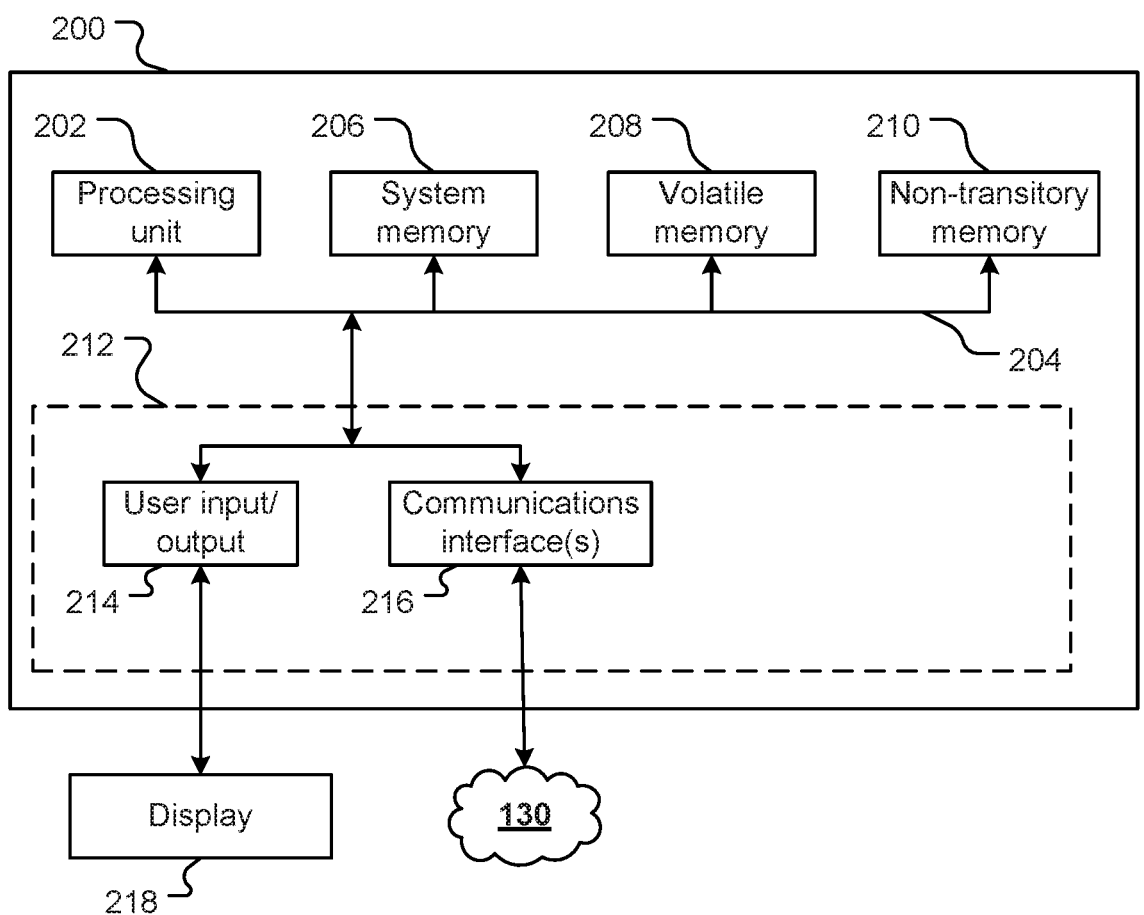
FIG. 2 is a block diagram of a computing system with which various embodiments of the present disclosure may be implemented.

FIG. 2 provides a block diagram of a computer processing system 200 configurable to perform various functions described herein. System 200 is a general purpose computer processing system. It will be appreciated that FIG. 2 does not illustrate all functional or physical components of a computer processing system. For example, no power supply or power supply interface has been depicted, however system 200 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 200 includes at least one processing unit 202. The processing unit 202 may be a single computer processing device (e.g. a central processing unit, graphics processing unit, or other computational device), or may include a plurality of computer processing devices. In some instances, where a computer processing system 200 is described as performing an operation or function all processing required to perform that operation or function will be performed by processing unit 202. In other instances, processing required to perform that operation or function may also be performed by remote processing devices accessible to and useable by (either in a shared or dedicated manner) system 200.

Through a communications bus 204, the processing unit 202 is in data communication with a one or more machine readable storage (memory) devices which store instructions and/or data for controlling operation of the processing system 200. In this example system 200 includes a system memory 206 (e.g. a BRSS), volatile memory 208 (e.g. random access memory such as one or more DRAM modules), and non-volatile memory 210 (e.g. one or more hard disk or solid state drives).

System 200 also includes one or more interfaces, indicated generally by 212, via which system 200 interfaces with various devices and/or networks. Generally speaking, other devices may be integral with system 200, or may be separate. Where a device is separate from system 200, connection between the device and system 200 may be via wired or wireless hardware and communication protocols, and may be a direct or an indirect (e.g. networked) connection.

Wired connection with other devices/networks may be by any appropriate standard or proprietary hardware and connectivity protocols. For example, system 200 may be configured for wired connection with other devices/communications networks by one or more of: Universal Serial Bus (USB); eSATA; Thunderbolt; Ethernet; HDMI. Other wired connections are possible.

Wireless connection with other devices/networks may similarly be by any appropriate standard or proprietary hardware and communications protocols. For example, system 200 may be configured for wireless connection with other devices/communications networks using one or more of: infrared; BlueTooth; WiFi; near field communications (NFC); Global System for Mobile Communications (GSM), Enhanced Data GSM Environment (EDGE), long term evolution (LTE), wideband code division multiple access (W-CDMA), code division multiple access (CDMA). Other wireless connections are possible.

Generally speaking, and depending on the particular system in question, devices to which system 200 connects—whether by wired or wireless means—include one or more input devices to allow data to be input into/received by system 200 for processing by the processing unit 202, and one or more output device to allow data to be output by system 200. Example devices are described below, however, it will be appreciated that not all computer processing systems will include all mentioned devices, and that additional and alternative devices to those mentioned may well be used.

For example, system 200 may include or connect to one or more input devices by which information/data is input into (received by) system 200. Such input devices may include keyboards, mice, trackpads, microphones, accelerometers, proximity sensors, GPS devices and the like. System 200 may also include or connect to one or more output devices controlled by system 200 to output information. Such output devices may include devices such as a CRT displays, LCD displays, LED displays, plasma displays, touch screen displays, speakers, vibration modules, LEDs/other lights, and such like. System 200 may also include or connect to devices which may act as both input and output devices, for example memory devices (hard drives, solid state drives, disk drives, compact flash cards, SD cards and the like) which system 200 can read data from and/or write data to, and touch screen displays which can both display (output) data and receive touch signals (input).

Where the system 200 is user device 130A or user device 130B, the system 200 includes or connects to a display 218 to output information. The display 218 may be a CRT display, LCD display, LED display, plasma display, or a touch screen display that can both display (output) data and receive touch signals (input).

System 200 also includes one or more communications interfaces 216 for communication with a network, such as network 102 of environment 100 (and/or a local network within the ITS 120 or CRS 140). Via the communications interface(s) 216 system 200 can communicate data to and receive data from networked devices, which may themselves be other computer processing systems.

System 200 may be any suitable computer processing system, for example, a server computer system, a desktop computer, a laptop computer, a netbook computer, a tablet computing device, a mobile/smart phone, a personal digital assistant, or an alternative computer processing system.

System 200 stores or has access to computer applications (also referred to as software or programs)—i.e. computer readable instructions and data which, when executed by the processing unit 202, configure system 200 to receive, process, and output data. Instructions and data can be stored on non-transitory machine readable medium accessible to system 200. For example, instructions and data may be stored on non-transitory memory 210. Instructions and data may be transmitted to/received by system 200 via a data signal in a transmission channel enabled (for example) by a wired or wireless network connection over interface such as 212.

Applications accessible to system 200 will typically include an operating system application such as Windows™, macOS™, iOS™, Android™, Unix™, Linux™, or other operating system.

Figure 3:
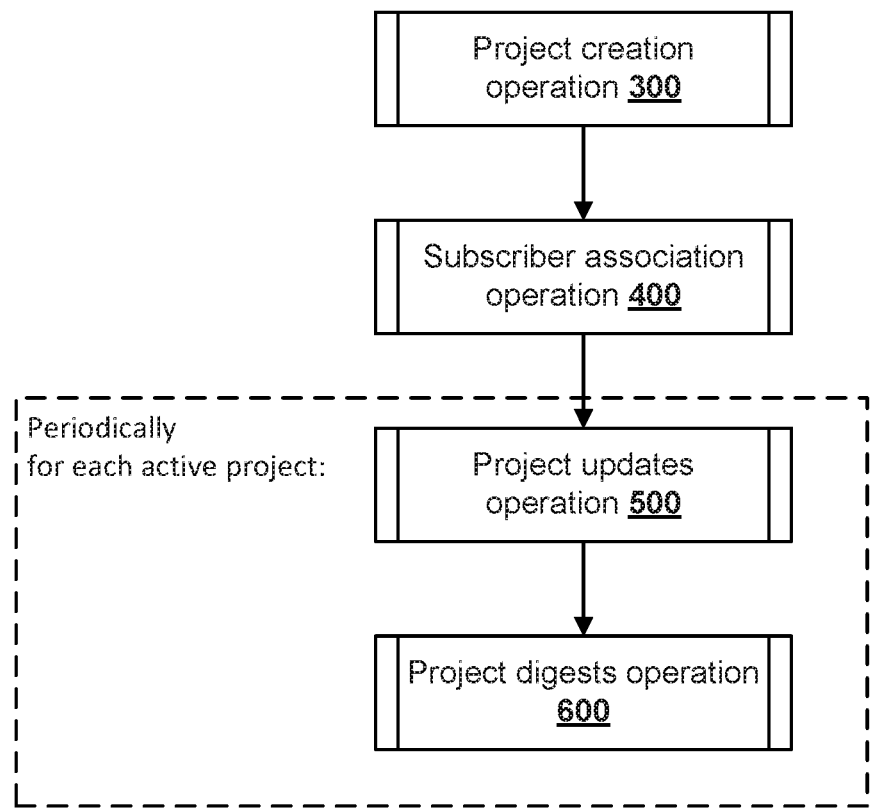
FIG. 3 is an overview of the operations involved in creating and managing projects.

System 200 also stores or has access to applications which, when executed by the processing unit 202, configure system 200 to perform various computer-implemented processing operations described herein. For example, and referring to the networked environment of FIG. 1 above a user device such as 130 includes a client application 132 which configures the user device 130 to perform various operations described herein. Similarly, server system 110 includes a server application 112 which configures the server system 110 to perform various operations described herein FIG. 3 provides an overview of the processing involved in creating and managing projects. These operations generally include project creation method 300, a subscriber association method 400, a project updates method 500, and a subscriber update method 600.

The project creation method 300 is a method for creating a project based on project data provided by a project creator (e.g. via the client application 132A on user device 130A).

The subscriber association method 400 is a method for subscribing users to projects based on requests from users (e.g. using client application 132A on user device 130A and/or client application 132B on user device 130B) to be subscribed to a project so that they receive project updates with respect to that project.

The project updates method 500 is a method for periodically prompting a project owner to provide a project update in relation to their project, receiving such an update, and storing the project update in data store 114.

The subscriber update method 600 is a method for generating a project update digest for a subscriber (the digest including project updates for projects the subscriber has subscribed to) and communicating the project update digest to the subscriber.

Figure 4:
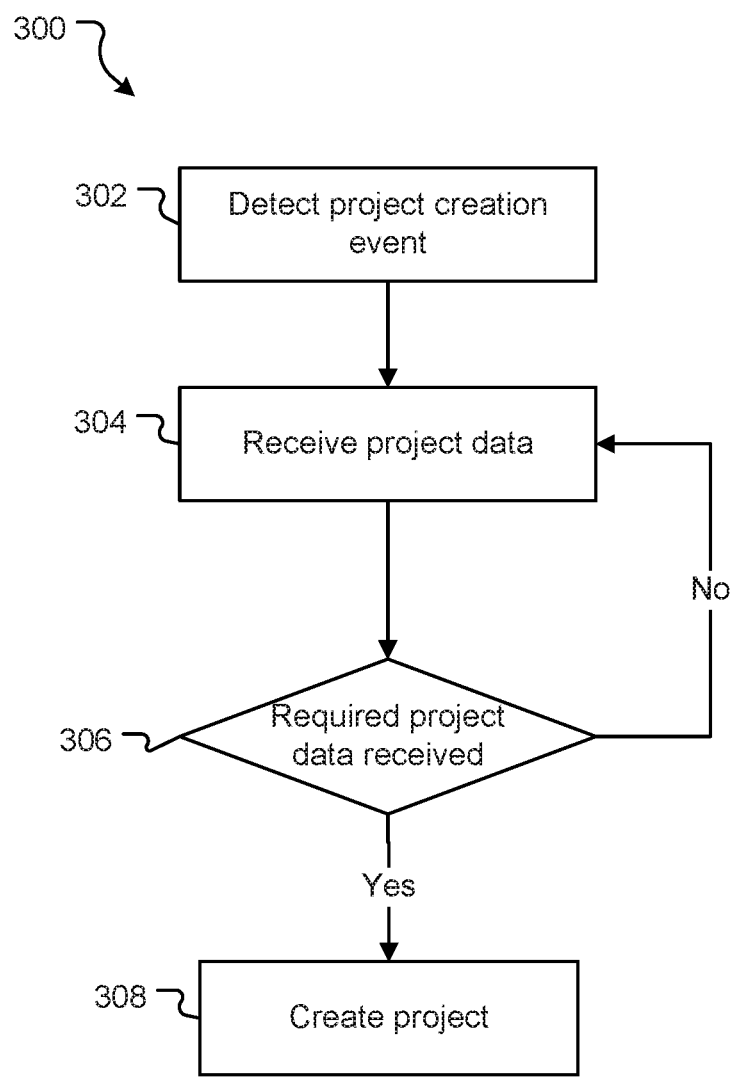
FIG. 4 is a flowchart of an example project creation method.

FIG. 4 is a flowchart depicting operations involved in of a project creation method 300. In the present example, the project creation method 300 is described as being performed by the PC management module 116 (PCM module 116 for short). The project creation method 300 could, however, be performed by an alternative module or application running on PC server system 110 or a separate system.

At 302, the PCM module 116 detects that a project creation event has occurred. This triggers the creation of a new project. The project creation method 300 may be triggered by a project owner or project creator (e.g. using client application 132A on user device 130A).

At 304, the PCM module 116 receives project data from the project creator (e.g. using the client application 132A on user device 130A). For example, the client application 132A may generate and display a project creation user interface (e.g. project creation user interface 350 described below) via which a project creator may input and submit project data, causing the input data to be communicated to (or otherwise received/retrieved by) the PCM module 116.

PCM module 116 may also (or alternatively) receive project data in other ways. For example, the project data may be received in a structured electronic communication (e.g. an email, instant message, SMS, or alternative electronic communication) sent to an address/endpoint accessible by the server application 112. In this case the PCM module 116 receives the communication and parses it to extract project data therefrom.

The project communication tool may be configured to require that particular project fields (i.e. required project fields) must be populated in order to create a project. The requirement may be enforced server side or client side.

For example, where required fields are enforced server side, at 306 the PCM module 116 determines if the project data received at 304 includes project field data relating to the required project fields. If so, the PCM module 116 proceeds to step 308. If not, the PCM module 116 may alert a user to any missing data (e.g. by causing a prompt to be displayed on a user interface displayed by client application 132, by an electronic communication to the project creator, or by alternative means) before processing returns to 304 to await for and receive further project data.

Alternatively, if required fields are enforced client side, the client application 132A may be configured to prevent creation of a project until all required fields have been populated. For example, and referring to interface 350 of FIG. 5 described below, client application 132A may be configured prevent activation of a 'create project' control such as control 372 until all required fields have been populated.

In certain embodiments, the required project fields are system defined. In alternative embodiments, server application 112 may be configured to allow users to define additional (and/or alternative) required project fields. For example, server application 112 may define a set of required project fields and an organization using the project communication tool may add further required project fields.

The project data may also include data relating to one or more project fields that do not need to be populated in order to create a project (i.e. optional project fields).

At 308, the PCM module 116 creates a project. In the present embodiment, to create a project the PCM module 116 generates a unique project identifier for the project and stores the project data received at 304 against the unique project identifier in the data store 114.

To illustrate this, and continuing with the example data structures above, creating a project may involve the PCM module 116 creating one or more of: a project record in a project details table; a project worker table record in a project worker table; a related projects record in a related projects table; a project groups record in a project groups table; and/or an associated goal record in an associated goal table. Once the project has been created and stored on the data store 114, the project creation method 300 has been completed.

Figure 5:
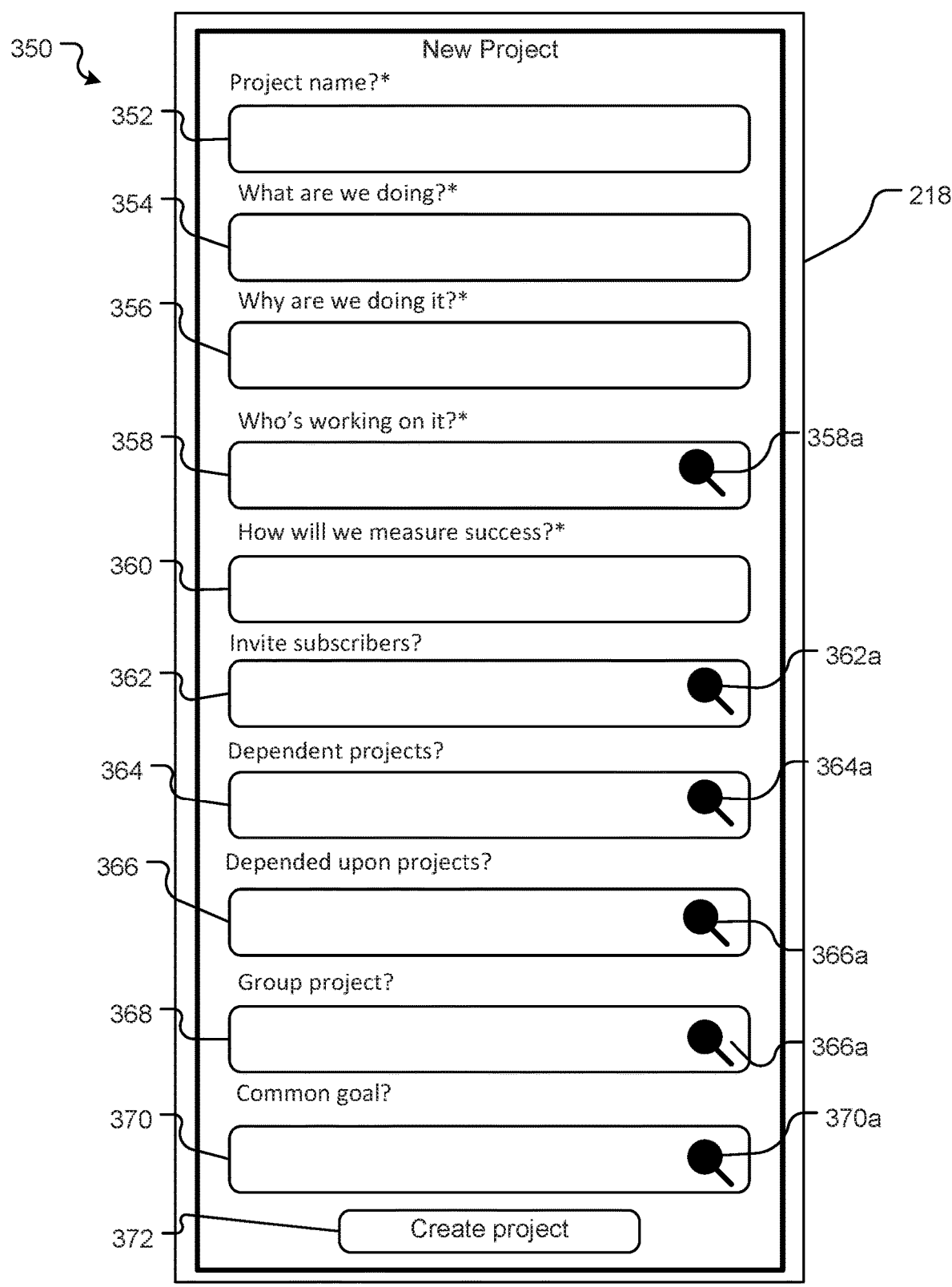
FIG. 5 is a project creation interface that a project creator may use to create a project.

FIG. 5 shows an example project creation user interface 350 for creating a project.

The project creation user interface 350 provides a plurality of data entry controls that allow the project creator to define the project data of the project being created. In this example, each data entry control corresponds with a project field of the project and allows the project creator to define data relating to that project field. In this example, the project creation user interface 350 includes the data entry controls listed below.

A project name control 352 allows the project creator to define the name of the project.

A project goal control 354 allows the project creator to define the project goal.

A project purpose control 356 allows the project creator to define the purpose of the project.

A project worker (or contributor) control 358 allows the project creator to define who will be working on the project. Workers may ultimately be recorded using user identifiers (i.e. to define individual workers), team identifiers (i.e. to define one or more groups of workers), and/or role identifiers (i.e. to define one or more roles of workers). In this example, a user search control 350a is provided which, if activated, causes a worker search interface to be displayed via which users/teams/roles can be searched for and selected. Searching for workers may be done by searching for the name of a particular individual, team, or role or by searching for the identifier of a particular, individual, team, or role. When searching by name, the name may be used to identify the user identifier of the worker, which may be stored in a user table stored on the data store 114. In an example, after the project creator has defined the workers and the create project control 372 has been activated, the PCM module 116 creates one or more worker records in a worker table stored on the PC data store 114. Each worker record defines the project identifier of the project and a user identifier of a user who will be working on the project.

A project success control 360 allows the project creator to define what will make the project successful (i.e. how success will be measured).

An invite subscribers control 362 allows the project creator to select individuals and/or teams who will then be invited to subscribe to/follow the project. As described below, any subscribers to a project receive periodic project updates in relation to the project. In this example, a user search control 362a is provided which, if activated, causes a user search interface to be displayed via which users can be searched for and selected. Searching for users may be performed using a similar, if not the same, method described above with respect to the project worker control 358.

A dependent projects control 364 allows a project creator to define one or more projects that will be dependent on the project being created. In this example, a user search control 364a is provided which, if activated, causes a user search interface to be displayed via which projects can be searched for and selected. Searching for projects may be done by searching for the project name of a project. The project name may be used to identify the project identifier of the project, which may be stored in a project details table stored on the data store 114.

A depended upon projects control 366 allows a project owner or project creator to define one or more projects upon which the project being created will be dependent. In this example, a user search control 366a is provided which, if activated, causes a user search interface to be displayed via which projects can be searched for and selected. Searching for projects may be performed using a similar, if not the same, method described above with respect to the dependent projects control 364.

In an example, defining related projects via the dependent projects control 364 and/or depended upon project controls 366 causes the PCM module 116 to create one or more related projects records in a related projects table stored on the PC data store 114. Each related projects record defines the project identifier of a dependent project the project identifier of a project being depended upon.

A group projects control 368 allows the project creator to select one or more project groups that the project being created is to belong to. In this example, a user search control 368a is provided which, if activated, causes a user search interface to be displayed via which project groups can be searched for and selected. Searching for project groups may be done by searching for the project group name. When searching by project group name, the project group name may be used to identify the project group identifier of the project group, which may be stored in a grouping table stored on the data store 114. In an example, defining one or more project groups causes the PCM module 116 to create one or more project group records in a grouping table stored on the PC data store 114. For example, each grouping record may define the project identifier of the project being created and a group identifier of a group that has been selected via group projects control 368.

A common goal control 370 allows a project creator to define one or more common goals the project being created will contribute to. In this example, a user search control 370a is provided which, if activated, causes a user search interface to be displayed via which common goals can be searched for and selected. Searching for common goals may be done by searching for the name of the common goal. When searching by common goal name, the common goal name may be used to identify the common goal identifier of the common goal, which may be stored in a common goals table stored on the data store 114. In an example, selecting one or more common goals via common goal control 370 causes the PCM module 116 to create one or more common goal records in a common goals table stored on the PC data store 114. For example, each common goal record may define a common goal identifier of a common goal that has been defined/selected by the common goal control 370 and the project identifier of the project being created.

Interface 350 also includes a create project control 372. When activated, the create project control 372 causes data entered via the data entry controls to be communicated to the server application 112 (and in particular the PCM module 116). The PCM module 116 then creates a project using the received data.

In example interface 350, asterisks are displayed to indicate required project fields that must be populated in order to create a project. In this example, and as described above, if a user attempts to activate the create project control 372 while one or more required project fields are empty, an alert will be displayed—for example highlighting the field(s) that need to be completed.

Figure 6:
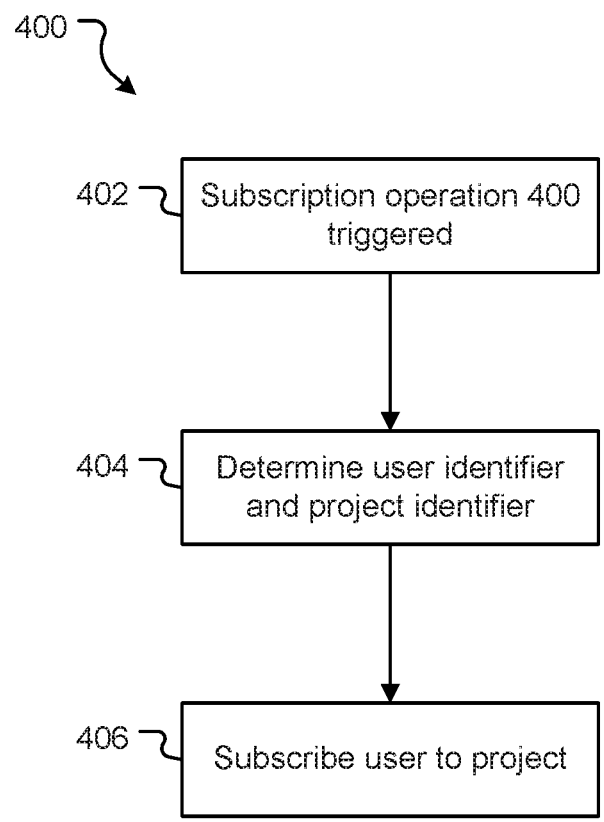
FIG. 6 is a flowchart of an example project subscription method.

FIG. 6 is a flowchart of the subscription method 400 for associating subscribers to a project. In the present example, the subscription operation 400 is described as being performed by the PCM module 116. The subscription operation 400 could, however, be performed by an alternative module or application running on PC server system 110 or a separate system.

At 402, the PCM module 116 detects that the subscription method 400 has been triggered for a project. The subscription method 400 may be triggered by a user (e.g. using client application 1328 on user device 1308) activating a subscribe/follow control for the project that is presented by a user interface on a display (e.g. display 218 of user device 130B). For example, subscription method 400 may be triggered via project searching user interface 450, described below.

Additionally, or alternatively, a user may receive an electronic communication (e.g. an email, instant message, SMS, or other communication) inviting the user to subscribe to a project—e.g. where a user is invited to subscribe during creation of the project. In this case the user may trigger the subscription method by activating a link or other control included in the communication (activation of the link or control causing data such as a user identifier and project identifier to be communicated to the PCM module 116).

At 404, in response to detecting that the subscription method 400 has been triggered for a project, the PCM module 116 determines the user identifier of the user who triggered the subscription method 400 and a project identifier. As an example, the user may have to login to the client application 132B before they subscribe to projects and the PCM module 116 may be able to determine the user identifier of the user based on their login details. Alternatively, in response to determining that the subscription method 400 has been triggered, the client application 132B may generate a user details interface on the display 218 of the user device 130B requesting the user provide user details, which the PCM module 116 may subsequently use to determine the user identifier of the user.

At 406, the PCM module 116 subscribes the user to the project by associating the user with the project in the data store 114. For example, the PCM module 116 may create a project subscription record (including the user ID and project ID) and write this to a project subscription table. Once the PCM module 116 has subscribed the user to the project, the subscription method 400 has been completed.

Figure 7:
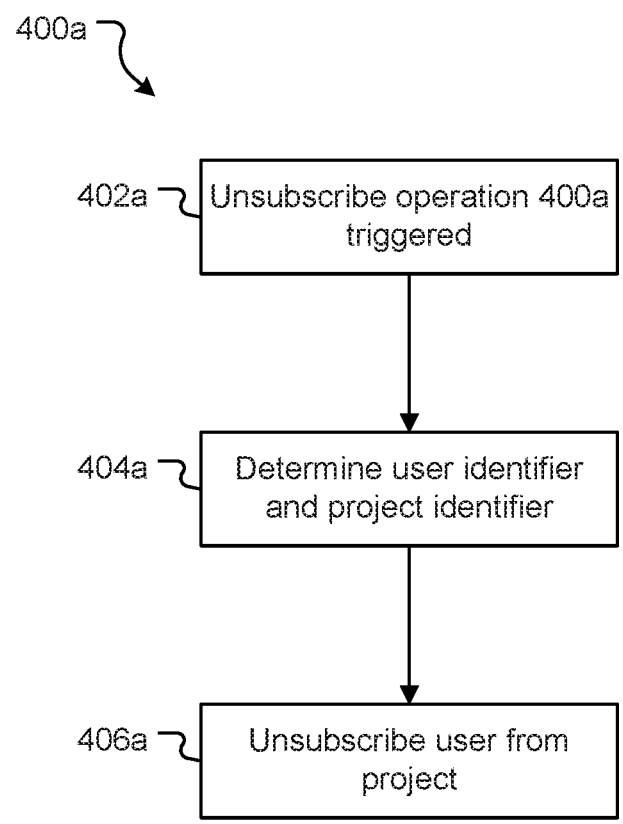
FIG. 7 is a flowchart of an example project unsubscribe method.

There may be situations where a user may wish to unsubscribe from a project. FIG. 7 is a flowchart of an unsubscribe operation 400a for unsubscribing a user from a project. In the present example, the unsubscribe operation 400a is described as being performed by the PCM module 116. The unsubscribe operation 400a could, however, be performed by an alternative module or application running on PC server system 110 or a separate system.

At 402a, the PCM module 116 detects that the unsubscribe operation 400a has been triggered for a project. The unsubscribe operation 400a may be triggered by a user (e.g. using client application 132B on user device 130B) activating an unsubscribe/leave control for the project that is presented by a user interface on a display (e.g. display 218 of user device 130B). For example, unsubscribe operation 400a may be triggered via project searching user interface 450, as described below.

At 404a, in response to detecting that the unsubscribe operation 400a has been triggered for a project, the PCM module 116 determines the user identifier of the user who triggered the unsubscribe operation 400a and the project identifier for that project. The user identifier of the user who triggered the unsubscribe operation 400a may be determined using the same method as described above at step 404 for the subscriber association method 400.

At 406a, the PCM module 116 unsubscribes the user from the project by updating the data store 114. For example, the PCM module 116 may identify the relevant project subscription record (i.e. one that includes the user identifier and project identifier in question) and delete it from a project subscription table. Once the PCM module 116 has unsubscribed the user from the project the unsubscribe operation 400a has been completed.

Figure 8:
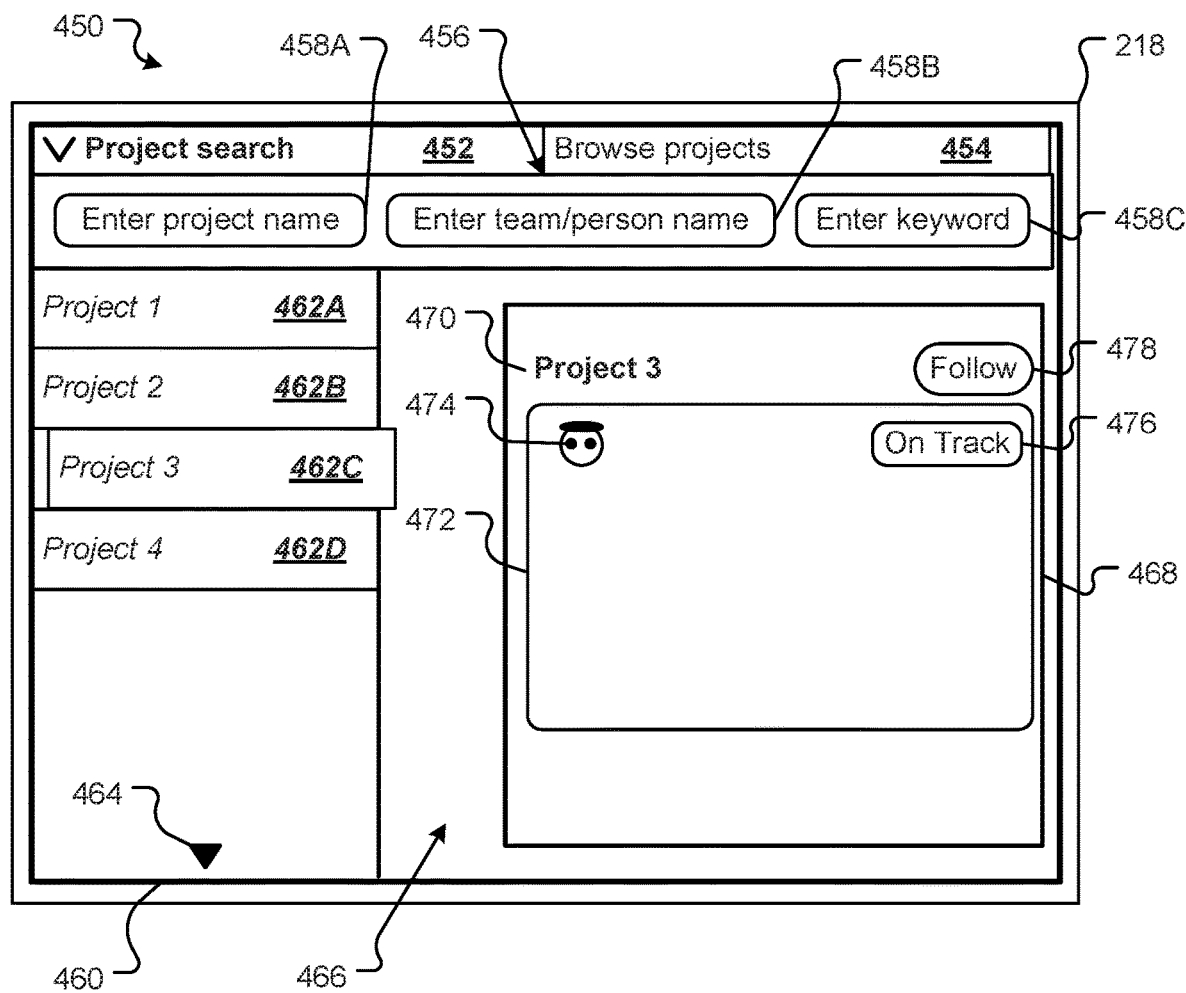
FIG. 8 is an example project searching user interface.

FIG. 8 shows an example project searching user interface 450 for users to search for, subscribe to, and unsubscribe from projects.

The project searching user interface 450 includes a project search control 452 and a browse projects control 454 that allow a user to search for or browse projects. In the example, the project search control 452 has been selected.

Selection of the project search control 452 causes a project search interface 456 to be displayed in the project searching user interface 450. The project search interface 456 may include a plurality of controls, for example, a project name search control 458A, a person/team search control 458B, and a keyword search control 458C that allow a user to search for projects in a variety of ways. For example, the user may use the project search interface 456 to search for projects by project name (by entering text into the project name search control 458A), a person or team name (by entering text in the person/team name search control 458B), and/or by keyword search (by entering text in the keyword search control 458C).

It is also envisaged that the person/team search control 458B may allow a user to specify a role (e.g. project owner, project worker, project subscriber, etc.). The search control of the project search interface 456 may also allow a user to construct a Boolean search using the project fields of projects (e.g. project owner, project worker, project subscriber, text in purpose field, etc.). Although the project search interface 456 has been described and illustrated as having the project search control 458A, the person/team search control 458B, and keyword search control 458C, it will be appreciated that the project search interface 456 may not include each of these search controls, may include additional search controls, or may include other search controls.

The project searching user interface 450 includes a search results region 460 that displays the results of a user's project search. Where a project search has been performed using the project search user interface 456, the search results region 460 displays a project card 462 for each project matching the search criteria of the project search. In the example illustrated by FIG. 8, the search results region 460 displays four project cards, 462A, 462B, 462C, and 462D. Each project card 462 displays the project name of the project to which the project card 462 relates. The project cards 462 could, however, display additional/alternative information relating to the corresponding projects (e.g. project data relating to one or more project fields of the project).

Where not all of the project cards 462 matching the search criteria of the search can be displayed in the search results region 460, the search results region 460 may include a 'more results' control 464 that, when selected by a user, displays further project cards 462 of the projects matching the search criteria of the project search. The further project cards 462 may be displayed in the search results region 460 or in another user interface that is displayed upon selection of the more results control 464 by a user.

If the keyword search control 458C is selected, the search results region 460 displays project cards of the projects in a particular order (e.g. alphabetically, by project name, by project owner, or any other order). When the browse projects control 458C is selected browser controls may be displayed on the project searching user interface 456 that may allow a user to filter/sort projects by particular project fields (e.g. project name, project owner, project worker, common goals, project groups).

The project search interface 456 has a project summary display region 466 that displays a project summary 468 of a particular project. Selection of a particular project card 462 causes the project summary 468 of the project relating to that project card 462 to be displayed in the project summary display region 466. In the example illustrated in FIG. 8, project card 462C has been selected and, therefore, the project summary 468 of the project (e.g., Project 3) relating to that project card 462 is displayed in the project summary display region 466.

The project summary 468 includes a project name section 470, a recent update section 472, an avatar section 474, a status indicator section 476, and a follow control 478.

The project name section 470 displays the project field data relating to the project name of the selected project. The client application 132B may use the project identifier of the project in question to identify a project details record in a project details table stored on the data store 114, retrieve the project field data relating to the project name, and display the project name in the project name section 470.

The recent update section 472 displays the update description relating to the most recent project update submitted by the project owner for the selected project. The client application 132B may use the project identifier of the project in question to identify a project update record in a project updates table stored on the data store 114, retrieve the most recent update description for the project, and display the most recent update description in the recent update section 472.

The avatar section 474 may display an avatar or picture of the project owner. The client application 132B may use the project identifier of the selected project to identify a project details record in a project details table stored on the data store 114 and identify the user identifier of the project owner. The client application 132B may then use the user identifier of the project owner to identify user details of the project owner stored in a user table on the data store 114, retrieve an avatar or picture of the project owner from the user details of the project owner, and display the avatar or picture of the project owner in the avatar section 474.

The status indicator section 476 displays project data relating to the project status of the selected project. The client application 132B may use the project identifier of the project in question to identify a project update record in a project updates table stored on the data store 114, retrieve the most recent project status for the project, and display the most recent project status data in the status indicator section 476.

The follow control 478 allows a user to follow (i.e. subscribe to) the selected project. Selection of the follow control 478 triggers the subscription operation 400 described above and subscribes the user to the project in question (e.g. by communicating the user's ID and the project ID of the selected project to the server application 114 (for processing by the PCM module 116).

Where a user is already following (i.e. subscribed to) the selected project, a leave control may be displayed in place of the follow control 478. Selection of the leave control triggers the unsubscribe operation 400a described above and unsubscribes the user from the selected project.

Figure 9:
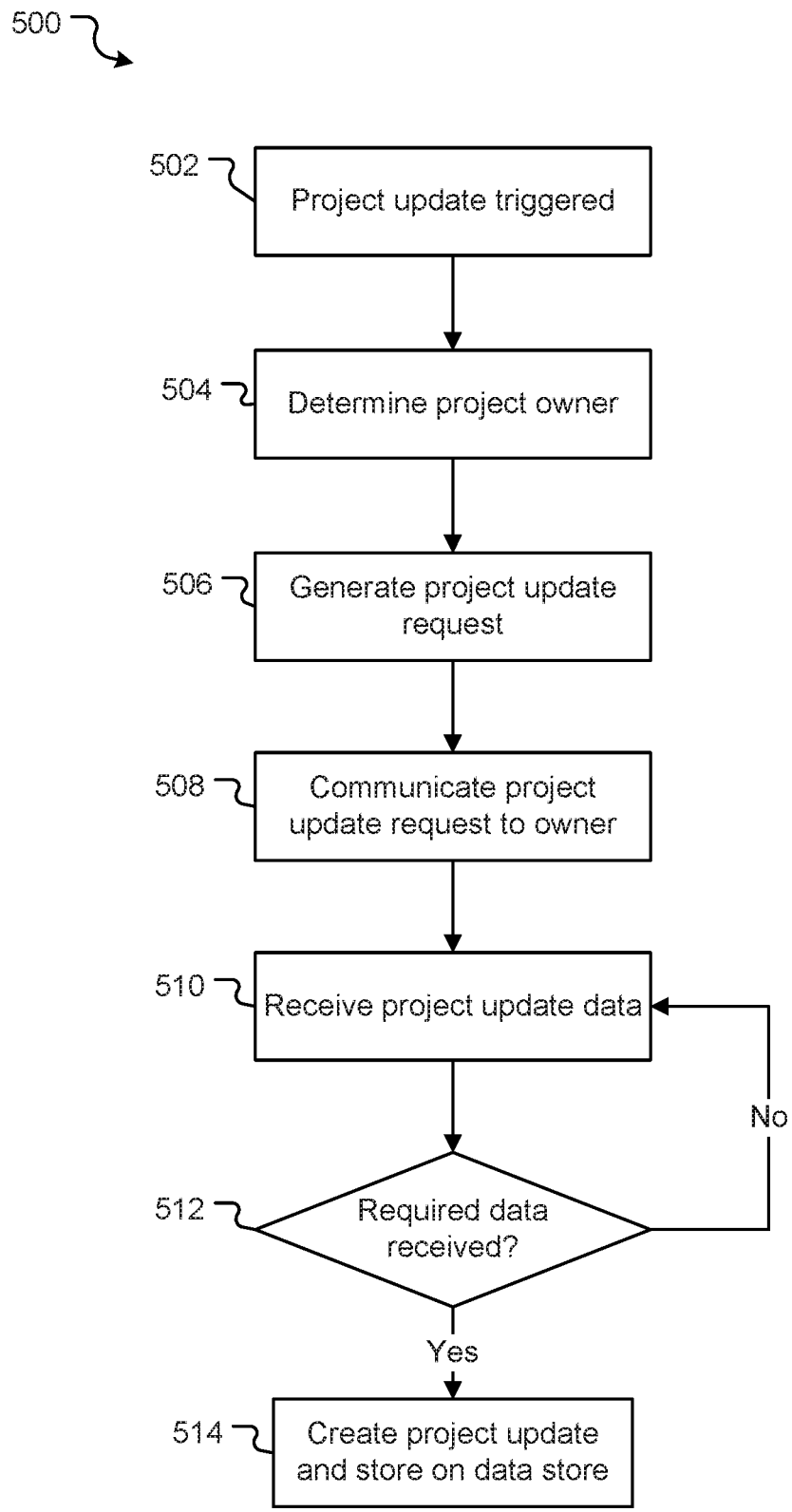
FIG. 9 is flowchart of an example project update method.

FIG. 9 is a flowchart of a project update process 500 for eliciting and receiving a project update from a project owner. In the present example, the project update method 500 is described as being performed by the project update module 118 The project update method 500 could, however, be performed by an alternative module or application running on PC server system 110 or separate system.

At 502, a project update process is triggered for a given project. A project update process for a given project may be triggered in various ways.

For example, in the present embodiment, the project update module 118 is configured to automatically and periodically request updates for all active projects maintained by system 110 according to a defined all-project update request cadence. The defined all-project update request cadence may define an all-project (or common) update request period (i.e. when the project update process repeats) and an all-project (or common) update request time (i.e. when the project update process is triggered within a given period). For example, the all-project update request cadence may be defined so that project update processes are triggered for all projects at: a particular time/day (the update time) of every week (the update period) (e.g. every Friday at 9 am); a particular time/day of every fortnight (e.g. every second Friday at 9 am); a particular time/day of every month (e.g. 9 am on the first Friday of every month), or at alternatively defined intervals.

In alternative embodiments, system 110 may allow project owners to define specific/bespoke project update request cadences for individual projects (or project groups) independently of other projects. A defined specific project update request cadence may define a specific project update request period (i.e. when the specific project update process repeats) and a specific project update request time (i.e. when the specific project update process is triggered within a given period). For example, the specific project update request cadence may be defined so that a project update process is triggered for the specific project at: a particular time/day (the update time) of every week (the update period) (e.g. every Friday at 9 am); a particular time/day of every fortnight (e.g. every second Friday at 9 am); a particular time/day of every month (e.g. 9 am on the first Friday of every month), or at alternatively defined intervals.

At 504, the project update module 118 determines the user identifier of the project owner of the project in question. As an example, the project update module 118 may determine the user identifier of the project owner by accessing a project details table stored on the data store 114.

At 506, the project update module 118 generates a project update request. The project update request is a request to the project owner for a project update. The project update request (and data included therein) may take various forms.

For example, a project update request may take the form of an electronic communication (e.g. an email, an instant message, an SMS, or an alternative electronic communication) and include a link or control that, when activated by the project owner, causes the client application 132A to generate and display a project update user interface (e.g. project update user interface 550 described below). The project owner may then input project update data in the project update user interface, which is subsequently communicated to and received by the project update module 118.

Alternatively (or additionally), the electronic communication may invite the user to respond to the communication and include the project update in the response.

At 508, the project update module 118 communicates the project update request generated at 506. Communication of a project update request will depend on the type of project update request—e.g. by email, instant message, SMS, or other communication means.

At 510, the project update module 118 receives project update data from the project owner, for example via the client application 132A on user device 130A. The project update data may be received in other ways. For example, the project update data may be received via a structured communication (e.g. email or the like) which the project update module 118 extracts the project update data from.

It may be required that particular project update fields (i.e. the required project update fields) must be populated in order to create a project update. Accordingly, at 512, the project update module 118 determines if the project update data received at 510 includes project update field data relating to the required project update fields. If so, the project update module 118 proceeds to step 514. If not, the project update module 118 may alert a user to any missing data (e.g. by causing a prompt to be displayed on a user interface displayed by client application 132, by an electronic communication to the project owner, or by alternative means) before processing returns to 510 to await for and receive further project update data.

The required project update fields may be system and/or user defined. For example, the project communication tool may define a set of required project update fields and an organization using the project communication tool may add further required project update fields. The project update data may also include data relating to one or more project update fields that do not need to be populated in order to create a project update (i.e. optional project update fields). By way of example, the project communication tool may require a status update to include an update description and a project status.

At 514, once the required update data has been received, the project communication module 118 creates a project update for the respective project based on the project update data received for that project at 510 and stores this project update against the project identifier for the project on the data store 114. For example, creating a project update may involve the project communication module 118 creating a project update record in a project updates table stored on the data store 114 and populating the project update fields as discussed above. The project update record defines the unique project identifier for the project to which the project update relates and one or more project update fields (e.g. the time the project update was created, the update description, and the project status). A given project update field of the project update is populated with project update field data from the project update data that relates to that project update field. Once the project update has been created and stored on the data store 114, the project update operation 500 has been completed.

In certain embodiments, if the project communication module 118 does not receive a project update within a predefined time period of communicating an update request (e.g. at 508), the project communication module 118 generates and communicates a reminder to the project owner for that project which requests again a project update.

Figure 10:
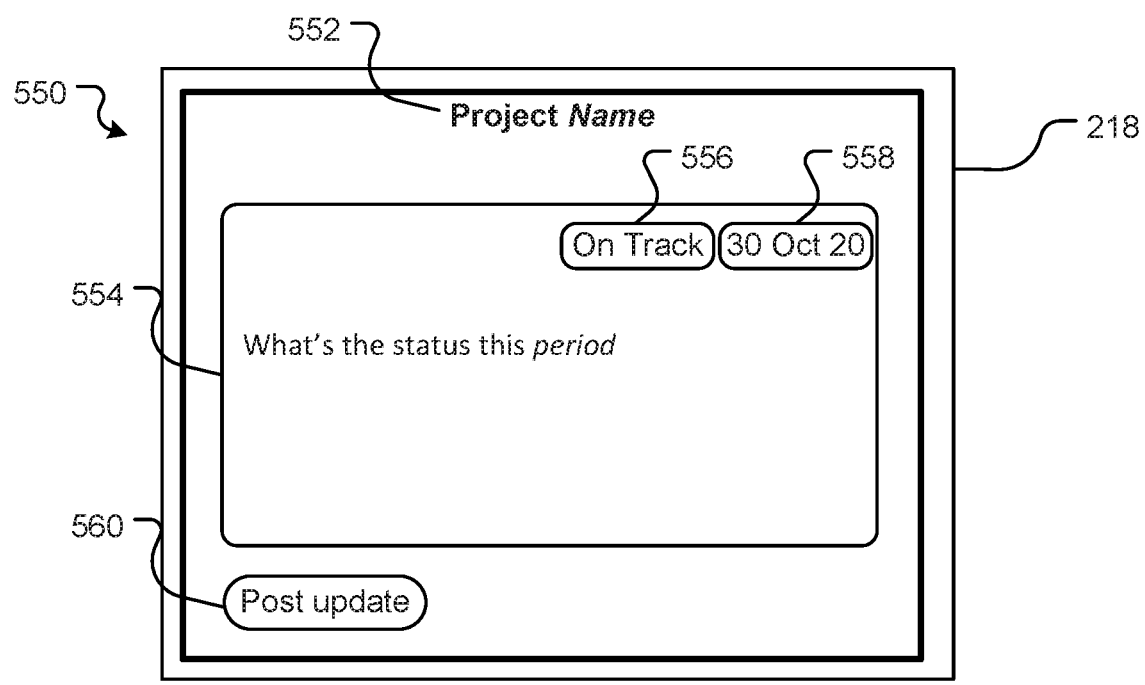
FIG. 10 is an example project update user interface.

FIG. 10 shows an example project update user interface 550 for project owners to submit project updates to the project update module 118. client application 132

The project update user interface 550 may be displayed on the display 218 of the project owner's user device 130A when the project owner is to provide a project update relating to their project. For example, the project user interface 550 may be displayed in response to the project owner selecting a 'provide update' control or link provided with a project update prompt.

The project update user interface 550 includes a project name section 552, a project update data entry control 554, a project status control 556, a timestamp indicator 558, and a post update control 560.

The project name section 552 displays the project field data relating to the project name of the project the project owner is submitting a project update for. The client application 132A may use the project identifier of the project in question to identify a project details record in a project details table stored on the data store 114, retrieve the project field data relating to the project name, and display the project name in the project name section 552.

The project update data entry control 554 allows the project owner to input an update description (e.g. text) explaining the project update. The update description may be limited to a predefined maximum number of words or characters (e.g. 280 characters) to force the project owner to provide a succinct project update for their project.

If the project owner wishes to provide more words/characters beyond the word/character limit or more information relating to the project update, the project update user interface 550 may include a notes control. If the project owner selects the notes control, a notes data entry control may be displayed within the project update user interface 550 that allows the project owner to provide more information relating to the project (e.g. more characters/words beyond the limit and/or images).

The project status control 556 indicates the current project status of the project in question. The project status control 556 is prepopulated with the current status of the project. For example, the project update module 118 may determine the project identifier to which the project update interface 550 relates, access the most recent project update record for the project in question in a project updates table stored on the data store 114, extract the project status from that project status update record, and display that project status in the project status control 556. The project update module 118 may determine the most recent project update record for a project based on the project identifier and timestamp of each project update record of the project updates table.

The project owner can update the project status of the project by selecting the project status control 556. Selection of the project status control 556 may cause the client application 132A of the project owner's user device 130A to display a list of predefined project statuses in the project update user interface 550 from which the project owner can choose from (e.g. "on track", "at risk", "ahead of schedule", "behind schedule", "completed on schedule", "completed behind schedule").

The timestamp indicator 558 indicates the time and/or date the project owner is submitting the project update. This may be prepopulated based on the current time and date at which the project owner is submitting the project update.

The post update control 560 allows a project owner to post (i.e. submit) the project data they have entered in the project update user interface 550. Selection of the post update control 560 causes the client application 132 to communicate the project update data to the project update module 118 which can then create a project update for the project in question (e.g. per operation 514 of the project update method 500 described above).

Figure 11:
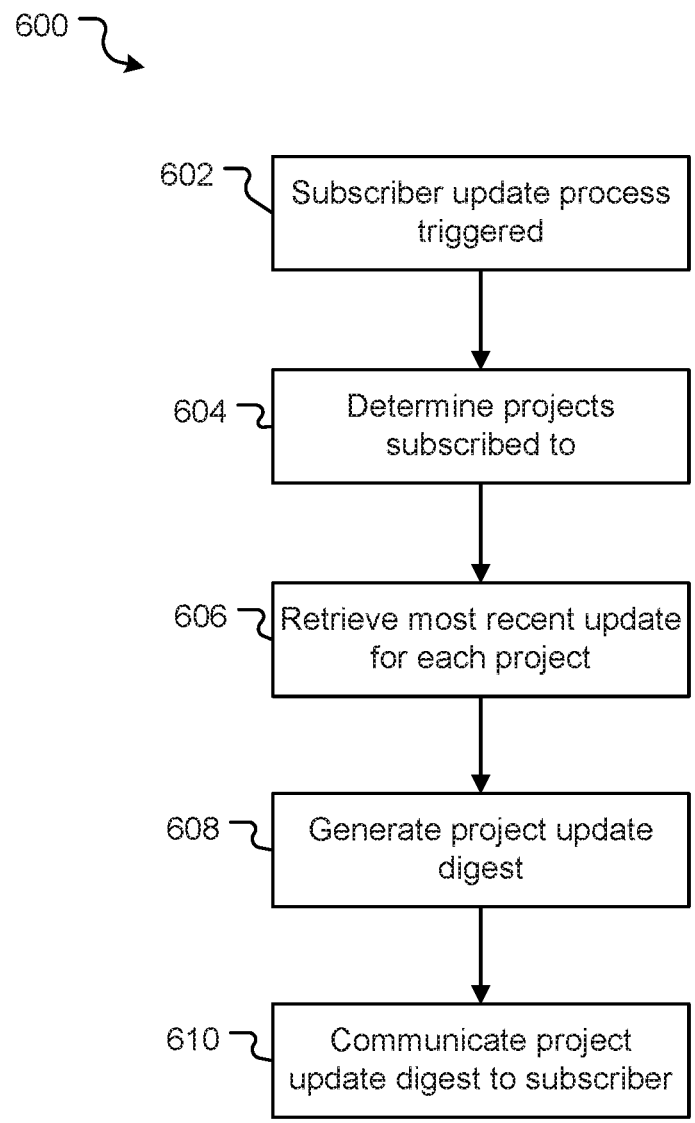
FIG. 11 is a flowchart of an example subscriber update method.

FIG. 11 is a flowchart of a subscriber update method 600 for generating and sending a project update digest to a user who subscribes to one or more projects. In the present example, the subscriber update method 600 is described as being performed by the digest management module 120. The subscriber update method 600 could, however, be performed by an alternative module or application running on PC server system 110 or separate system.

At 602, a subscriber update process is triggered for a given user (the user being a subscriber to at least one project). A subscriber update process for a given user may be triggered in various ways.

For example, in the present embodiment, the subscriber update module 120 is configured to automatically and periodically generate updates for all users who subscribe to one or more projects according to a defined all-subscriber update cadence. The defined all-subscriber update cadence may define an all-subscriber (or common) subscriber update period (i.e. when the subscriber update process repeats) and an all-subscriber (or common) subscriber update time (i.e. when the subscriber update process is triggered within a given period). For example, the all-subscriber update cadence may be defined so that subscriber update processes are triggered for all subscribers at: a particular time/day (the update time) of every week (the update period) (e.g. every Friday at 9 am); a particular time/day of every fortnight (e.g. every second Friday at 9 am); a particular time/day of every month (e.g. 9 am on the first Friday of every month), or at alternatively defined intervals.

In alternative embodiments, system 110 may allow subscribers to define specific/bespoke subscriber update cadences. A defined specific subscriber update cadence may define a specific subscriber update period (i.e. when the specific subscriber update process repeats) and a specific subscriber update time (i.e. when the specific subscriber update process is triggered within a given period). For example, the specific subscriber update cadence may be defined so that a subscriber update process is triggered for the subscriber in question: a particular time/day (the update time) of every week (the update period) (e.g. every Friday at 9 am); a particular time/day of every fortnight (e.g. every second Friday at 9 am); a particular time/day of every month (e.g. 9 am on the first Friday of every month), or at alternatively defined intervals.

In certain embodiments, the project communication tool is configured to enforce (or at least provide as default) a defined all-project update cadence and a defined all-subscriber update cadence. This has the benefit of enforcing (or at least suggesting) common time periods so that project owners know when updates are required for all projects (e.g. Friday every week), so that project subscribers know when they will receive update digests (e.g. Monday every week), and the project update cadence is complementary to the subscriber update cadence (i.e. so, for example, a subscriber does not set a weekly subscriber update cadence for projects that have monthly project update cadences). For example, if the project update module 118 is configured to trigger project update processes for all active projects every Friday at 9 am, the digest management module 120 may be configured to trigger subscriber update processes for all subscribers every Monday at 9 am. More generally, the digest management module 120 may be configured to periodically trigger subscriber update processes a defined time period after the project update module 118 is configured to periodically trigger project update processes. The defined time period should be set to allow project owners sufficient time to receive and respond to project update requests. For example, the defined time period may be 12 hours, 24 hours, 2 days, 3 days, or any other defined time period.

In alternative embodiments, system 110 may allow individual project subscribers to schedule times at which they wish to receive project update digests (independently of when other subscribers schedule to receive digests).

At 604, the digest management module 120 determines the projects the subscriber in question is subscribed to. This may be done, for example, by querying a subscriber table stored on the data store 114. In the above example, the subscriber table includes a record for each project that the subscribed in question is subscribed to. Each record includes the subscriber's user ID (allowing the subscriber to be identified) and a project ID (identifying the project subscribed to).

At 606, the digest management module 120 accesses the data store 114 and retrieves the project update data received in response to the latest project update request for each project identified at 604. As an example, the digest management module 120 may access a project updates table stored on the data store 114 that defines a project update record for each project update created for each project. Each project update record defines the project identifier to which the project update records relates and project update data for the project (e.g. a timestamp relating to when the project update was created, update description, and a project status). The digest management module 120 may determine the project update received in response to the latest project update request for each project based on when the project update method 500 was last triggered, the project identifier, and timestamp of each project update record.

At 608, the digest management module 120 generates a project update digest based on the project update(s) retrieved at 606.

If a project update was not received for a particular project in response to the latest project update request, the digest management module 120 may not retrieve any project data relating to that project. In this case, the project update digest for a subscriber subscribed to this project may not include any project updates for this project or may indicate that no project update is available for this project.

At 610, the digest management module 120 communicates the project update digest generated at 608 to the subscriber. As an example, the digest management module 120 may communicate the project update digest to the subscriber as a project update digest notification sent to the client application 132B on the subscriber's user device 130B, by email to the subscriber's nominated email address(es), and/or by other communication means. As an example, the subscriber's user identifier stored in a subscriber table may be used to identify the subscriber's details in a user table to determine the subscriber's nominated email address(es).

The project update digest notification may include a digest control that, when selected by the subscriber, causes the client application 132B to generate and display a project update digest user interface (e.g. project update digest user interface 650 or project update digest user interface 650a described below).

Figure 12:
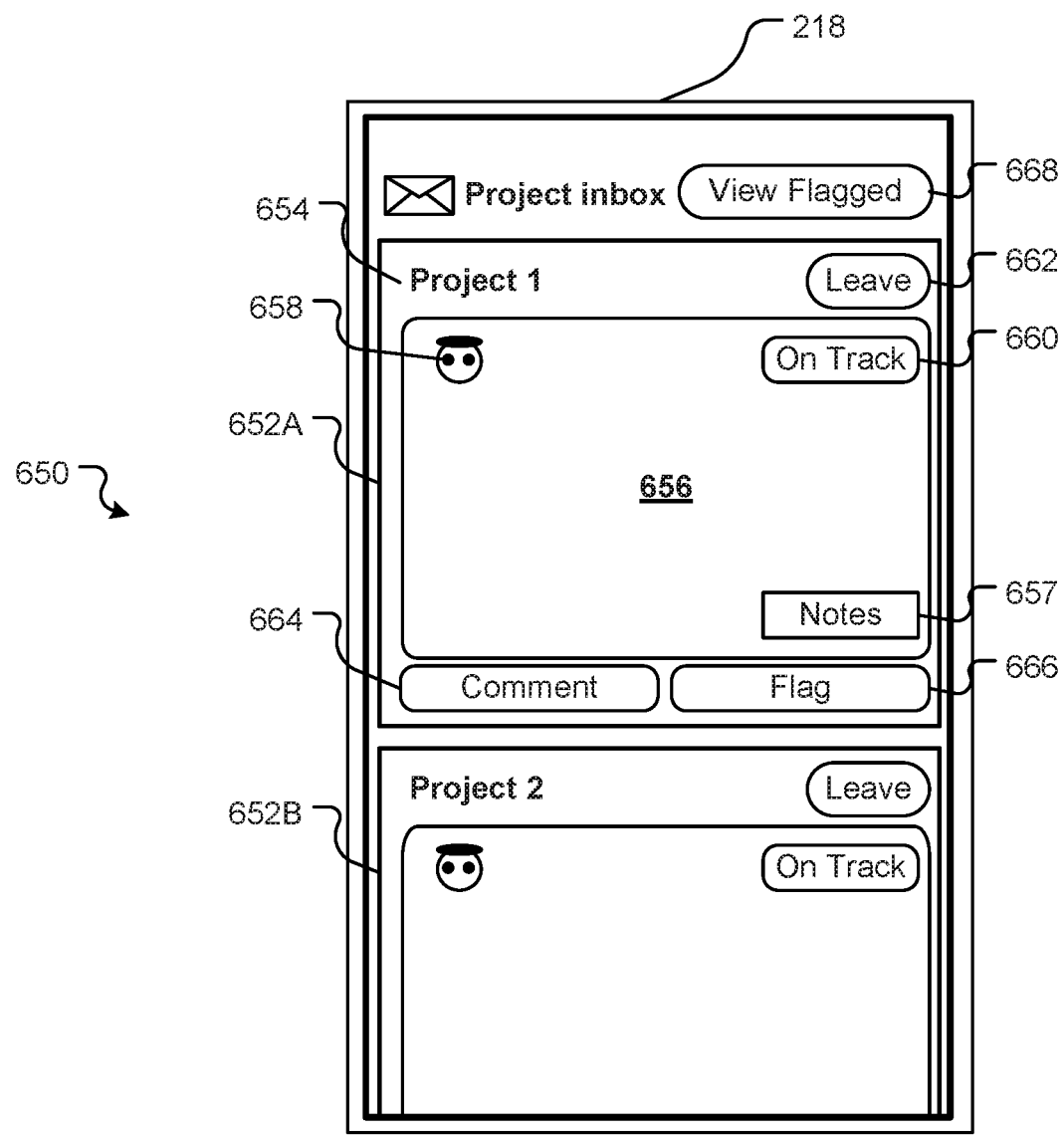
FIG. 12 is an example subscriber update user interface.

FIG. 12 shows an example scrolling project update digest user interface 650.

The project update digest user interface 650 may be displayed on the display 218 of the subscriber's user device 130B when the subscriber wishes to view their project updates digest. For example, the project update digest user interface 650 may be displayed in response to the subscriber selecting a digest control provided with the project updates digest notification. Alternatively, where the project update digest is sent as a project update digest email, the project update user interface 650 may be displayed in the body of the email when the subscriber opens project update digest email.

The project update digest user interface 650 includes a project update object 652 for each project that the user is subscribed to. The scrolling project update digest user interface 650 allows a subscriber to view each project update object 652 by scrolling through a list of project update objects 652. In the example illustrated in FIG. 12, the project update digest user interface 650 is displaying two project update objects 652A and 652B that are directed to two projects (i.e. "Project 1" and "Project 2", respectively) that the subscriber is subscribed to. Project update object 652B is only partially displayed on the display 218 of the subscriber's user device 130B. The subscriber can scroll down through the project updates digest to view the project update object 652B fully.

Each project update object 652 includes a project name section 654, a project summary section 656, an avatar 658, a status indicator 660, a leave control 662, a comment control 664, a flag control 666, and a view flagged control 668.

The project name section 656 displays the project field data relating to the project name of the project to which the project update object 652 is directed.

The project summary section 656 displays the most recent update description submitted by the project owner of the project to which the project update object 652 is directed. In particular, the project summary section 656 displays the most recently submitted update description submitted by the project owner at step 506 of the project update operation 500.

The avatar section 658 may display an avatar or picture of the project owner. The client application 132B may use the project identifier of the project in question to identify a project details record in a project details table stored on the data store 114 and identify the user identifier of the project owner. The client application 132B may then use the user identifier of the project owner to identify user details of the project owner stored in a user table on the data store 114, retrieve an avatar or picture of the project owner from the user details of the project owner, and display the avatar or picture of the project owner in the avatar section 658.

The status indicator 660 indicates the current project status of the project to which the project update object 652 is directed. In particular, the status indicator 660 displays the most recently submitted project status submitted by the project owner at step 506 of the project update operation 500.

The leave control 662 allows a subscriber to leave/unsubscribe from a project. If the subscriber selects the leave control 662, the unsubscribe operation 400a will be triggered.

The comment control 664 allows a subscriber to post comments in relation to a project update object. If the subscriber selects the comment control 664, a comment interface may be displayed that allows the subscriber to enter and submit a comment. The comment may be stored in a project update record relating to the project update in a project updates table stored on the data store 114.

The flag control 666 allows a subscriber to flag a particular project update object 652 so that they can view the project update object 652 at a later stage. If the flag control 666 of a particular project update object 652 is selected by the subscriber, the client application 132B of the subscriber's user device 130B adds the project update object 652 to a list of flagged project update objects 652.

The view flagged control 668 allows a subscriber to view the list of flagged project update objects 652. If the subscriber selects the view flagged control 668, a flagged project updates user interface is displayed on the display 218 of the subscriber's user device 130B. The flagged project updates user interface is similar to the project update digest user interface 650, except that the flagged project updates user interface only displays project update objects 652 that have been flagged by the subscriber. Further, in the flagged projects updates user interface an unflag control may be displayed in place of the flag control 666. If the subscriber selects the unflag control of a flagged project update object 652, the client application 132B of the subscriber's user device 130B removes the project update object 652 from the list of flagged project update objects 652.

If a project owner has provided any notes relating to the project, the project update object 652 may include a notes control (e.g. 657) that, when selected by the subscriber, displays the project owner's additional notes in relation to the project update (e.g. in a pop-up dialogue box or alternative user interface element). Accordingly, the notes are not displayed in the project update objects 652 by default.

Figure 13:
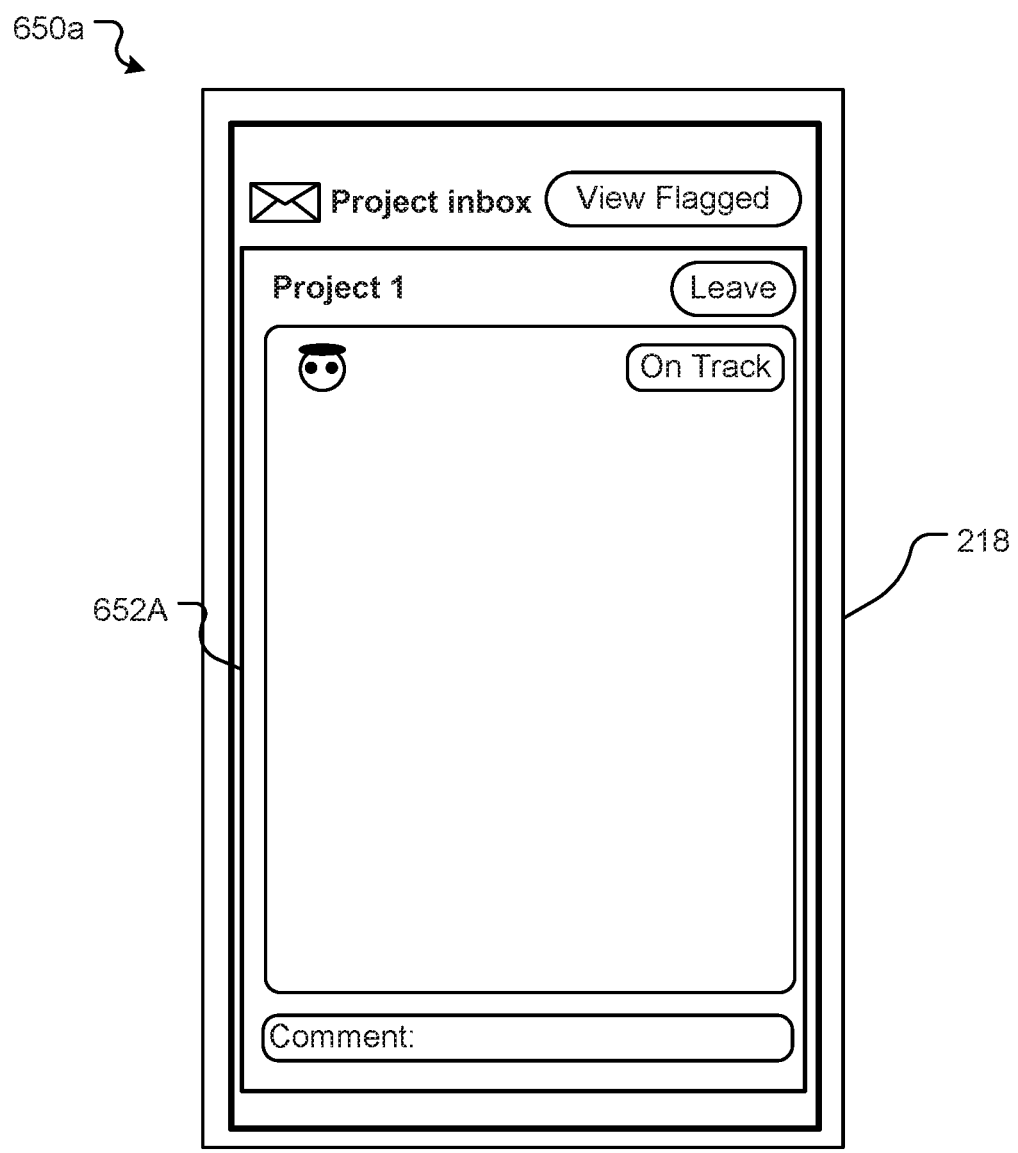
FIGS. 13 and 14 depict an alternative example subscriber update user interface.

FIG. 13 is an example of a swiping project update digest user interface 650a. The swiping project update user interface 650a is similar to the scrolling project update user interface 650, except that the swiping project update user interface 650a displays the project update objects 652 as a stack of project update objects 652 instead of a list of project update objects 652 that the subscriber can scroll through. In FIG. 13, the swiping project update user interface 650a only displays a single project update object 652 at a time. The swiping project update user interface 650a is directed primarily to user devices 130B that have a touch screen display 218.

The subscriber interacts with the project update objects 652 displayed in the swiping project update user interface 650a by either swiping a project update object 652 to the left or right. Swiping a project update object 652 to the left may remove the project update object 652 from the display 218 and mark the project update object 652 as read, thereby removing the project update object 652 from the subscriber's project update digest. Swiping a project update object 652 to the right may remove the project update object 652 from the display 218 and add the project update object 652 to a list of flagged project update object 652.

Figure 14:
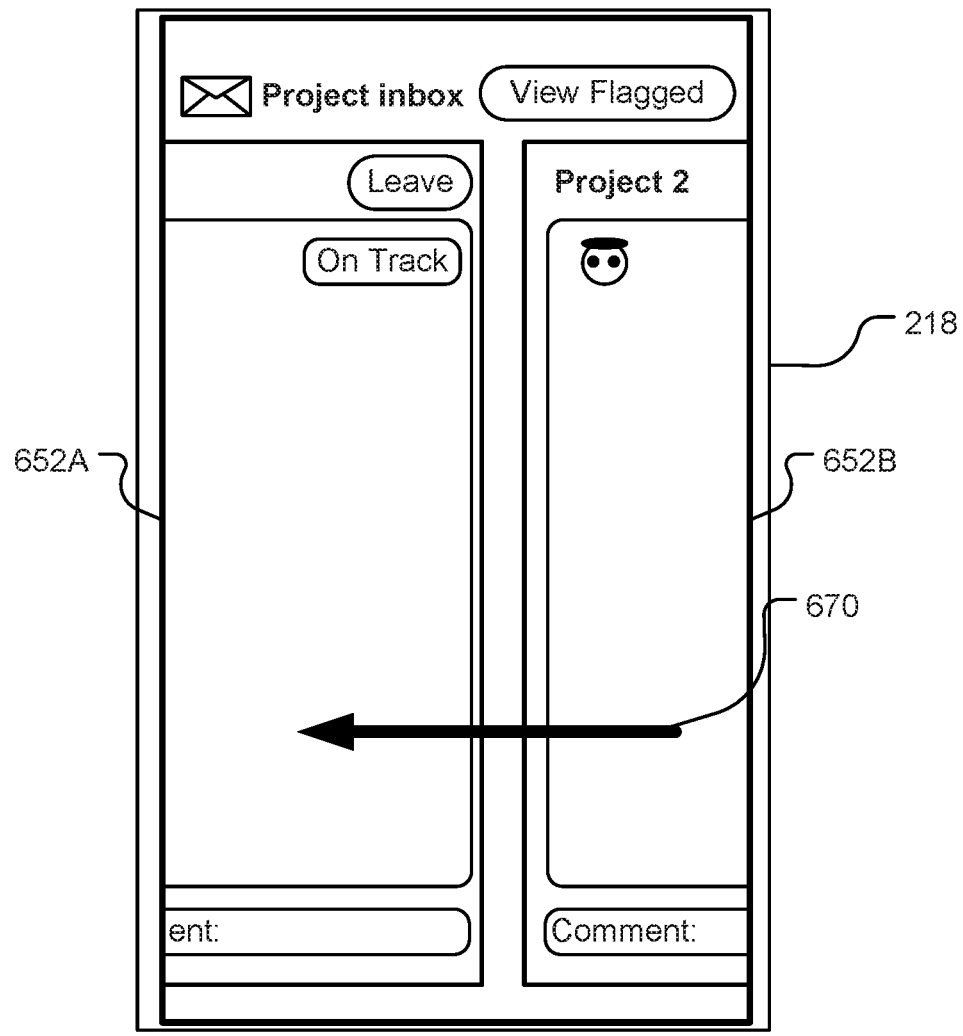

Swiping a project update object 652 either to the right or left removes the project update object 652 from the display 218 and causes another project update object 652 to be displayed on the display 218. FIG. 14 illustrates the project update object 652A being swiped to the left in the direction of arrow 670 and the project update object 652B that will be subsequently displayed.

Once a subscriber has swiped all the project update objects 652 of their project update digest either to the left or right, no more project update objects 652 will be displayed. The subscriber may view any flagged project update objects 652 in the same way as described above with respect to the scrolling project update user interface 650.

Figure 15:
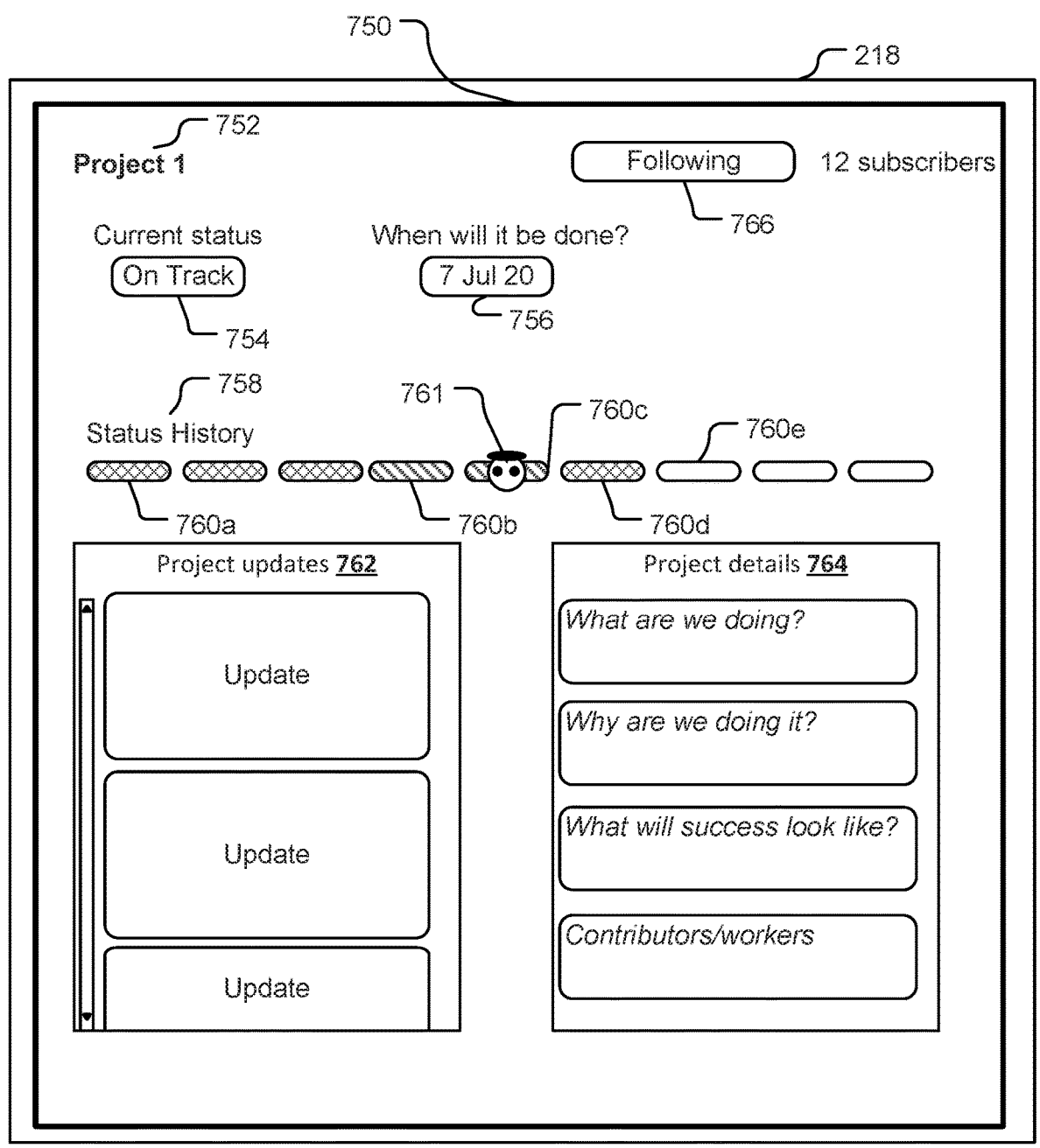
FIG. 15 is an example detailed project view interface.

FIG. 15 shows an example detailed project view interface 750 of a project.

The detailed project view interface includes a project name section 752, a status indicator 754, a project completion indicator 756, a status history indicator 758 having a plurality of history bars 760, a project updates section 762, and a project details section 764.

The project name section 752 displays the project name of the project the detailed project view interface 750 is displaying.

The current status indicator 754 indicates the current status of the project.

The project completion indicator 756 provides an indication of when the project is due to be completed. The project completion indicator 756 may indicate a specific date, a period of time (e.g. a specific month or a specific quarter), or that selection of a completion date or period has been deferred. The project completion indicator 756 may be updated when the project owner provides periodic project updates relating to the project at step 506 of the project update operation 500.

In the present embodiment, if the project completion indicator 756 displays a specific date this indicates that the project owner has a relatively high level of confidence that the project will be completed by this date. If the project creation indicator 756 displays a period of time, the project owner is confident that the project will be finished within that period. If the project completion indicator 756 indicates that selection of the completion date or period has been deferred, the project owner is currently unable to provide an indication of when the project will be completed but should be able to by the date or period displayed by the project completion indicator 756. In the example detailed project view interface 750, the project owner has high confidence that Project 1 will be completed by 7 Jul. 2020.

If the project owner is viewing the detailed project view user interface 750 (e.g. on the display 218 of the project owner's user device 130A), the project creation user interface 756 may be a control that allows the project owner to update the project completion indicator 756. If the project owner selects this control, a project completion date/period user interface may be displayed within the detailed project view interface 750 that will allow the project owner to select a specific date, a specific period of time, or a date by which they will provide a project completion date or period. The project completion indicator 756 will subsequently be updated to display what the project owner selected in the project completion date/period user interface.

The status history 760 defines the status history of the project. Each bar 760 in the status history relates to a project update submitted by the project owner for the project and indicates the status of the project at the time the respective project update was submitted. Status indication may be by displaying the bar with a particular color and/or pattern fill indicative of the project status—for example green for on track, yellow for at risk, red for behind schedule etc. The status history 760 therefore provides an indication of the project has tracked over time. For the example project illustrated in FIG. 15, the first three bars 760a may indicate the project status was "on track", the next two 760b and 760c may indicate that the project was behind schedule, the following bar 760d that the project is currently on track (bar 760d indicating the current status as the remaining bars 760e are unfilled, indicating they relate to future updates). This shows a user that the project is currently on track, however was previously behind schedule.

Each bar 760 may display one or more visual indicators that indicate certain changes made to the project within the time period relating to the project update. For example, a bar 760 may include one or more visual indicators indicating that the completion date/period of the project has been updated and that one or more individuals and/or teams have been added to the project.

In the example illustrated in FIG. 15, history bar 760c includes an avatar 761 indicating that one or more workers have been added to the project. The avatar 761 may display a particular avatar or image that may allow the subscriber to easily identify the individual. The avatar 761 may also be a control that, when selected by the subscriber, causes a worker summary interface to be displayed within the detailed project view user interface 750 that provide information relating to the individual. Alternatively, selecting the avatar 761 control may cause a worker user interface relating to the individual to be displayed that provides information relating to the individual.

The project updates section 762 lists all the project updates relating to the project. The detailed project user interface 750 may allow a user to scroll through the project updates section 762 to view all projects updates relating to the project.

The project details section 764 lists other project field data relating to the project. In this example, the project details include: the project purpose ('what are we doing'); the project goal ('why are we doing it'); the success definition ('what will success look like'); and the names of the users and/or teams working on (contributing to) the project.

In the example project illustrated in FIG. 15, detailed project view interface also includes a following control 766 (and associated text indicating the number of subscribers). In some implementations, when the following control 766 is selected a list of subscribers to the project is displayed.

The detailed project view interface 750 may also include an edit control if it is the project owner viewing the project. If the project owner selects the edit control, a project edit interface similar to the project creation interface 350 will be displayed that will allow the project owner to edit one or more project fields of the project.

Figure 16:
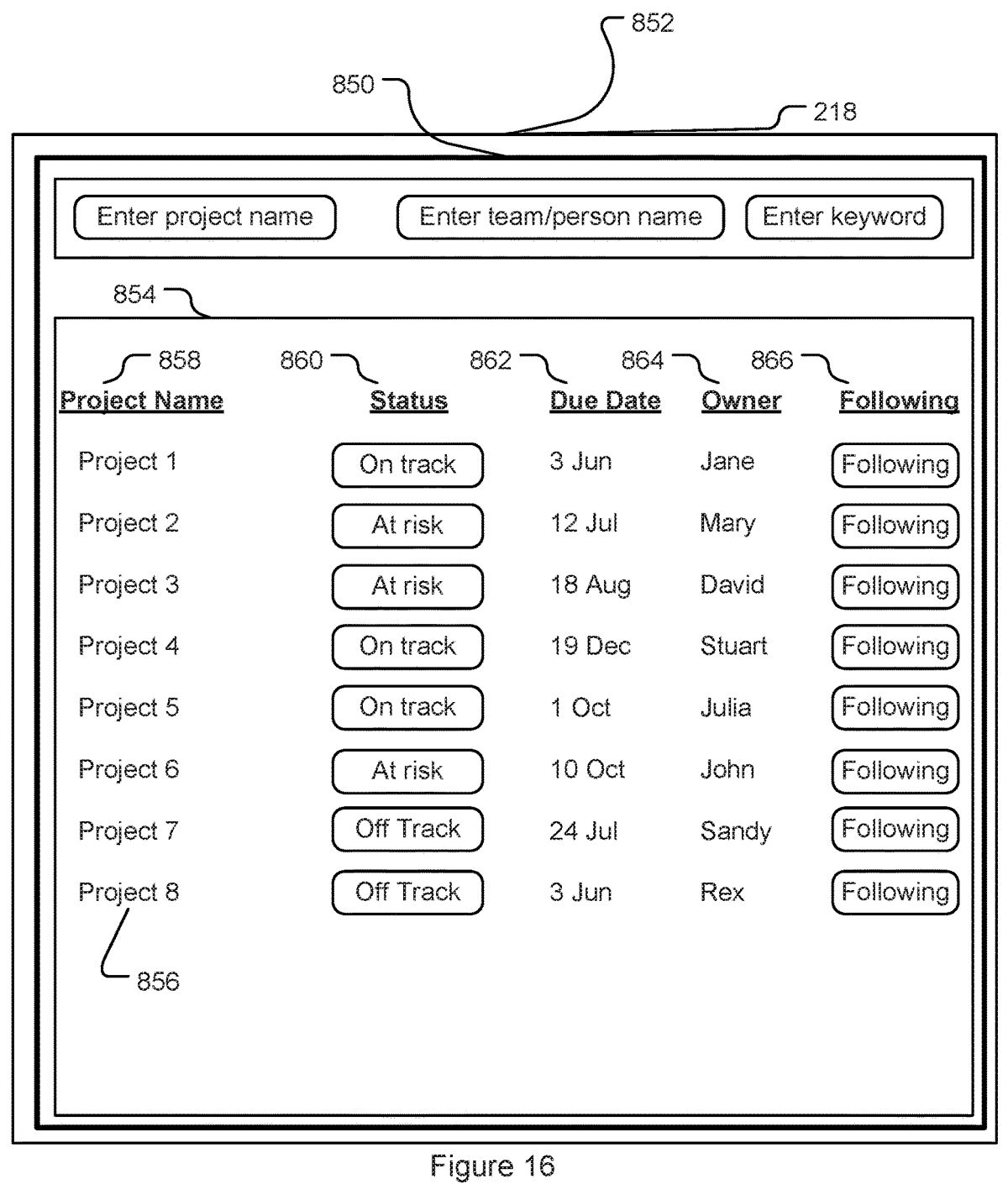

FIG. 16 shows an example subscribed projects interface 850 of a subscriber.

The subscribed projects interface 850 includes a project searching section 852 and a list 854 of subscribed project records 856.

The project searching section 852 may allow a subscriber to search for projects using a similar method to that described above with respect to project searching user interface 450.

Each subscribed project record 856 relates to a project that the subscriber is subscribed to. For each displayed project record 856 interface 850 displays the project name 858, project status 860, estimated completion date 862, project owner 864, and a follow control 868 of the project to which subscribed project records 856 relates. It will be appreciated that each subscribed project record may define more or less project data fields.

The subscriber may select a subscribed project record 856 from the list 854, which will cause the client application 134B to display the detailed project view interface 750 for the project to which the selected subscribed project record 856 relates. If the subscriber selects the follow control 868 of a subscribed project record 856, the unsubscribe operation 400a will be triggered.

Example user interfaces have been described and depicted above—for example a project creation user interface 350 (FIG. 5), a project searching user interface 450 (FIG. 8), a project update user interface 550 (FIG. 10), a project update digest user interface 650 (FIG. 12), a project update digest user interface 650a (FIGS. 13 and 14), a detailed project view user interface 750 (FIG. 15), and a subscribed projects user interface 850 (FIG. 16). A given user interface may be generated by a client application 132 (e.g. client application 132A or 132B) running on a user device 130 (e.g. device 130A or 130B respectively) and displayed on the display 218 of the user device 130. A user may interact with a given user interface through one or more input devices (e.g. computer mouse and keyboard) connected to, or integral with, the user device 130. These input devices may allow a user to select, activate, input text, or otherwise interact with one or more of the user interface controls described. Where a user device 130 includes a touch screen display, the user may interact with the relevant interface through one or more touch inputs on the touch screen display.

As used herein the terms "include" and "comprise" (and variations of those terms, such as "including", "includes", "comprising", "comprises", "comprised" and the like) are intended to be inclusive and are not intended to exclude further features, components, integers or steps.

Various features of the disclosure have been described using flowcharts. The functionality/processing of a given flowchart operation could potentially be performed in various different ways and by various different systems or applications. Furthermore, it may be possible for a given flowchart operation to be divided into multiple operations and/or multiple flowchart operations to be combined into a single operation. Furthermore, in some instances the order of the steps may be able to be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. A computer implemented method comprising:

storing project data for a plurality of projects in a data store, the project data for each project including a project name, a project description, a project owner, and project subscription data, respective project subscription data for a respective project defining one or more subscribers to the respective project;

according to a defined project update cadence, automatically triggering, by a project communication server system, a project update process, the project update process comprising:

identifying a particular user identifier associated with a particular project owner of a particular project of the plurality of projects;

generating a project update prompt including a link or a control for the particular project;

transmitting, via a computer network, the project update prompt to the particular project owner of the particular project; and in response to a user selection of the link or the control of the project update prompt, causing display of a project update user interface on a project owner client device, the project update user interface comprising a project update data entry control that allows the particular project owner to input an update description providing details of project update of the particular project;

receiving, at the project communication server system and via the computer network, from one or more project owner client devices, a plurality of project updates, each project update corresponding to a specific project and received by a respective project update data entry control of a respective project update user interface generated in response to a respective project update prompt;

storing the plurality of project updates in the data store;

providing remote access to the plurality of project updates to a set of subscriber client devices over the computer network;

according to a defined subscriber update cadence, automatically triggering, by the project communication server system, a subscriber update process, the subscriber update process comprising:

identifying one or more projects of the plurality of projects that a particular subscriber is subscribed to;

retrieving, from the data store, a set of project updates for the one or more projects that the particular subscriber is subscribed to, at least one project update of the set of project updates includes the update description providing details of the at least one project update;

based on the retrieved set of project updates, generating a project update digest for the particular subscriber, the project update digest comprising a set of graphical objects, each graphical object comprising a project summary, a status indicator, and a flag control corresponding to the one or more projects that the particular subscriber is subscribed to;

transmitting, via the computer network, the project update digest to a subscriber client device;

causing display of the set of graphical objects on the subscriber client device in a digest interface that allows the particular subscriber to scroll or swipe to view each graphical object of the set of graphical objects using an input device of the subscriber client device; and in response to a user selection of a particular flag control of a particular graphical object displayed on the digest interface, adding the particular graphical object to a list of flagged project update objects.

2. The computer implemented method of claim 1, wherein the project update process for the particular project is automatically triggered at a set of predetermined time periods according to a the defined project update cadence.

3. The computer implemented method of claim 1, wherein project update processes for all projects are automatically and periodically triggered at common project update times according to an all-project update cadence.

4. The computer implemented method of claim 1, wherein the subscriber update process for the particular subscriber is automatically and periodically triggered at particular subscriber update times according to the defined subscriber update cadence.

5. The computer implemented method of claim 1, wherein subscriber update processes for all subscribers are automatically and periodically triggered at common subscriber update times according to an all-subscriber update cadence.

6. The computer implemented method of claim 1, wherein:

project update processes for all projects are automatically and periodically triggered at common project update times according to an all-project update cadence;

subscriber update processes for all subscribers are automatically and periodically triggered at common subscriber update times according to an all-subscriber update cadence; and the common subscriber update times are set to be complementary to the common project update times.

7. The computer implemented method of claim 1, wherein, in response to determining that the subscriber update process has been triggered for the particular subscriber, the computer implemented method further comprises:

determining that a given project update for a given project that the particular subscriber is subscribed to has not been received; and in response to determining that the given project update for the given project has not been received, generating the project update digest to indicate that the given project update for the given project is not available.

8. The computer implemented method of claim 1, further comprising:

receiving new project data; and in response to receiving the new project data, creating a new project using the new project data, the new project being one of the plurality of projects.

9. The computer implemented method of claim 1, further comprising:

receiving a subscription request to subscribe a particular user to the particular project; and in response to receiving the subscription request, subscribing the particular user to the particular project by associating the particular user with the particular project in the data store.

10. The computer implemented method of claim 1, further comprising:

receiving an unsubscribe request to unsubscribe a particular user from the particular project; and in response to receiving the unsubscribe request, unsubscribing the particular user from the particular project by removing an association of the particular user with the particular project from the data store.

11. A project communication server system comprising:

a processing unit;

a communications interface; and a non-transitory computer-readable storage medium storing sequences of instructions, which when executed by the processing unit, cause the processing unit to:

store project data for a plurality of projects in a data store, the project data for each project including a project name, a project description, a project owner, and project subscription data, respective project subscription data for a respective project defining one or more subscribers to the respective project;

according to a defined project update cadence, automatically triggering a project update process, the project update process causes the processing unit to:

identify a particular user identifier associated with a particular project owner of a particular project of the plurality of projects;

generate a project update prompt including a link or a control for the particular project;

transmit, via a computer network, the project update prompt to the particular project owner of the particular project; and in response to a user selection of the link or the control of the project update prompt, cause display of a project update user interface on a project owner client device, the project update user interface comprising a project update data entry control that allows the particular project owner to input an update description providing details of project update of the particular project;

receive, via the computer network and from one or more project owner client devices, a plurality of project updates, each project update corresponding to a specific project and received by a respective project update data entry control of a respective project update user interface generated in response to a respective project update prompt;

store the plurality of project updates in the data store;

provide remote access to the plurality of project updates to a set of subscriber client devices over the computer network;

according to a defined subscriber update cadence, automatically trigger a subscriber update process, the subscriber update process causes the processing unit to:

identify one or more projects of a plurality of projects that a particular subscriber is subscribed to;

retrieve, from the data store, a set of project updates for the one or more projects that the particular subscriber is subscribed to, at least one project update of the set of project updates includes the update description providing details of the at least one project update;

based on the retrieved set of project updates, generate a project update digest for the particular subscriber, the project update digest comprising a set of graphical objects, each graphical object comprising a project summary, a status indicator, and a flag control corresponding to the one or more projects that the particular subscriber is subscribed to;

transmit, via the computer network, the project update digest to a subscriber client device;

cause display of the set of graphical objects on the subscriber client device in a digest interface that allows the particular subscriber to scroll or swipe to view each graphical object of the set of graphical objects using an input device of the subscriber client device; and in response to a user selection of a particular flag control of a particular graphical object displayed on the digest interface, add the particular graphical object to a list of flagged project update objects.

12. The project communication server system of claim 11, wherein the project update process for the particular project is automatically triggered at a set of predetermined time periods according to the defined project update cadence.

13. The project communication server system of claim 11, wherein project update processes for all projects are automatically and periodically triggered at common project update times according to an all-project update cadence.

14. The project communication server system of claim 11, wherein the subscriber update process for the particular subscriber is automatically and periodically triggered at particular subscriber update times according to the defined subscriber update cadence.

15. The project communication server system of claim 11, wherein subscriber update processes for all subscribers are automatically and periodically triggered at common subscriber update times according to an all-subscriber update cadence.

16. The project communication server system of claim 11, wherein:

project update processes for all projects are automatically and periodically triggered at common project update times according to an all-project update cadence;

subscriber update processes for all subscribers are automatically and periodically triggered at common subscriber update times according to an all-subscriber update cadence; and the common subscriber update times are set to be complementary to the common project update times.

17. The project communication server system of claim 11, wherein, in response to determining that the subscriber update process has been triggered for the particular subscriber, execution of the sequences of instructions further causes the processing unit to:

determine that a given project update for a given project that the particular subscriber is subscribed to has not been received; and in response to determining that the given project update for the given project has not been received, generate the project update digest to indicate that the given project update for the given project is not available.

18. The project communication server system of claim 11, wherein execution of the sequences of instructions further causes the processing unit to:

receive new project data; and in response to receiving the new project data, create a new project using the new project data, the new project being one of the plurality of projects.

19. The project communication server system of claim 11, wherein execution of the sequences of instructions further causes the processing unit to:

receive a subscription request to subscribe a particular user to the particular project; and in response to receiving the subscription request, subscribe the particular user to the particular project by associating the particular user with the particular project in the data store.

20. The project communication server system of claim 11, wherein execution of the sequences of instructions further causes the processing unit to:

receive an unsubscribe request to unsubscribe a particular user from the particular project; and
in response to receiving the unsubscribe request, unsubscribe the particular user from the particular project by removing an association of the particular user with the particular project from the data store.

\* \* \* \* \*